(12) United States Patent
Winnemoeller

(10) Patent No.: US 10,809,898 B2
(45) Date of Patent: Oct. 20, 2020

(54) COLOR PICKER

(71) Applicant: Adobe Inc., San Jose, CA (US)

(72) Inventor: Holger Winnemoeller, Seattle, WA (US)

(73) Assignee: Adobe Inc., San Jose, CA (US)

( * ) Notice: Subject to any disclaimer, the term of this patent is extended or adjusted under 35 U.S.C. 154(b) by 28 days.

(21) Appl. No.: 15/980,589

(22) Filed: May 15, 2018

(65) Prior Publication Data

US 2019/0354265 A1    Nov. 21, 2019

(51) Int. Cl.
*G06F 3/0484*    (2013.01)
*G06T 11/00*    (2006.01)
*G06F 3/0488*    (2013.01)
*G06F 3/0482*    (2013.01)

(52) U.S. Cl.
CPC ...... *G06F 3/04845* (2013.01); *G06F 3/04883* (2013.01); *G06T 11/001* (2013.01); *G06F 3/0482* (2013.01); *G06F 3/04847* (2013.01); *G06T 2200/24* (2013.01)

(58) Field of Classification Search
None
See application file for complete search history.

(56) References Cited

U.S. PATENT DOCUMENTS 8,334,847 B2 * 12/2012 Tomkins ............ G06F 3/04883
345/173
2008/0062192 A1 * 3/2008 Voliter ................ G06F 3/04845
345/591

2011/0252344 A1 * 10/2011 van Os .................... G06F 9/451
715/763
2015/0242099 A1 * 8/2015 Wallace ................ G06T 11/001
345/594

OTHER PUBLICATIONS

Susan Smith, "Create a Color Palette from a photo in GIMP", 2012, https://blog.starsunflowerstudio.com/create-color-palette-from-photo-in-gimp/ (Year: 2012).*
Chris Cox, "Photoshop: Color Picker History", 2016. https://feedback.photoshop.com/photoshop_family/topics/color_picker_history. (Year: 2016).*
Steven Wittens, "Farbtastic Color Picker", https://acko.net/blog/farbtastic-jquery-color-picker-plug-in/, 2006. (Year: 2006).*

* cited by examiner

*Primary Examiner* — Nicholas R Wilson
(74) *Attorney, Agent, or Firm* — SBMC

(57) ABSTRACT

In implementations of a color picker, a color picker is generated and exposed in the context of color adjustment, making it easier for a user to select an appropriate color than with full-screen color pickers. A color picker acts as a window into a larger color map by exposing a portion of the color map selectable with touch gestures, enabling a user to easily access any content of a color map having very large numbers of color, at any desired level of detail, and determine a desired color. An indicator of current color at a fixed position of a color picker is updated in real time as content exposed by the color picker is updated. Hence, the current color is determined without obstruction by a user, as opposed to a user touching directly on a color to select a current color.

20 Claims, 13 Drawing Sheets
(3 of 13 Drawing Sheet(s) Filed in Color)

COLOR PICKER

BACKGROUND

Color pickers are used to select a color, such as a color to be applied to a digital image as part of an image editing process. For instance, a color picker may display a color palette on a touchscreen of a mobile device from which a color can be selected with a user touch on the touchscreen. However, most color pickers display only a small subset of the millions of colors capable of being displayed by modern touchscreens, which limits the user's ability to select an appropriate color.

To display as many colors as possible to a user, color pickers are usually displayed full-screen on a device, especially for devices with smaller screens (e.g., phones). Hence, the color picker consumes most or all of the device's touchscreen. Consequently, the color picker is not displayed in context of the image for which the color is to be applied, making it difficult for a user to select a desired color. For instance, a user may be forced to iterate steps including selecting a color from a color picker that is displayed full-screen, closing or moving the color picker to expose an image, and applying the color to the image until an acceptable color is applied to the image, which is cumbersome and inefficient for the user.

Moreover, most color pickers displayed on touchscreens of devices, such as smart phones or tablets, facilitate color selection through a touch gesture. For instance, a user can select a color displayed on a color picker by touching the color on the touchscreen with the user's finger. As a result, the user's finger acts to obscure the actual color that is being selected from the color picker, making it difficult for the user to select an appropriate color, especially for users with large fingers. Furthermore, the accuracy of the color selected depends on the touchscreen's ability to interpret the position of the user's finger on the touchscreen, making it difficult for the user to select an exact color for color pickers that display a continuity of colors, especially for touch gestures with large contact areas on the touchscreen.

SUMMARY

Techniques, systems, and devices are described to display a color picker in the context for which color is to be adjusted, such as on a touchscreen together with a digital image to be edited. The color picker exposes a portion of the color map on the touchscreen (e.g., a plane of colors), and the color map may include other portions that are not currently exposed by the color picker, but are accessible and can be exposed by the color picker responsive to a user gesture, such as a pan or zoom gesture. For instance, the color picker represents a window into the color map whose position on the color map and coverage of the color map can be changed based on a user gesture, such as a drag gesture to slide the position of the color picker relative to the color map or a zoom gesture to zoom into or out of a portion of the color map. Hence, a color map may be a large array of colors, such as one-dimensional (1D) (e.g., a ramp of colors), two-dimensional (2D) (e.g., a rainbow in one dimension and black to white in another dimension), or three dimensional (3D) (e.g., a color map representing colors in a 3D color space, such as hue, saturation, and lightness).

The color picker also includes an indicator of a current color, such as a circle in the center of the color picker. Rather than selecting the current color by touching on it and therefore making it difficult to select the color, due to obstruction by a user's finger, the indicator is continuously updated to indicate the current color of the color picker (e.g., the center of the color picker) as the user moves or zooms the color picker relative to the larger color map, such as with drag and zoom gestures. Accordingly, a large color map including millions of colors can be represented by the color picker that depicts a portion of the color map at any one time, and a portion of the color map depicted by the color picker can be changed in a continuous fashion based on user gestures. Hence, a user can quickly determine a color with infinite accuracy and without obstruction from the user's finger in the context that the color is to be applied.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
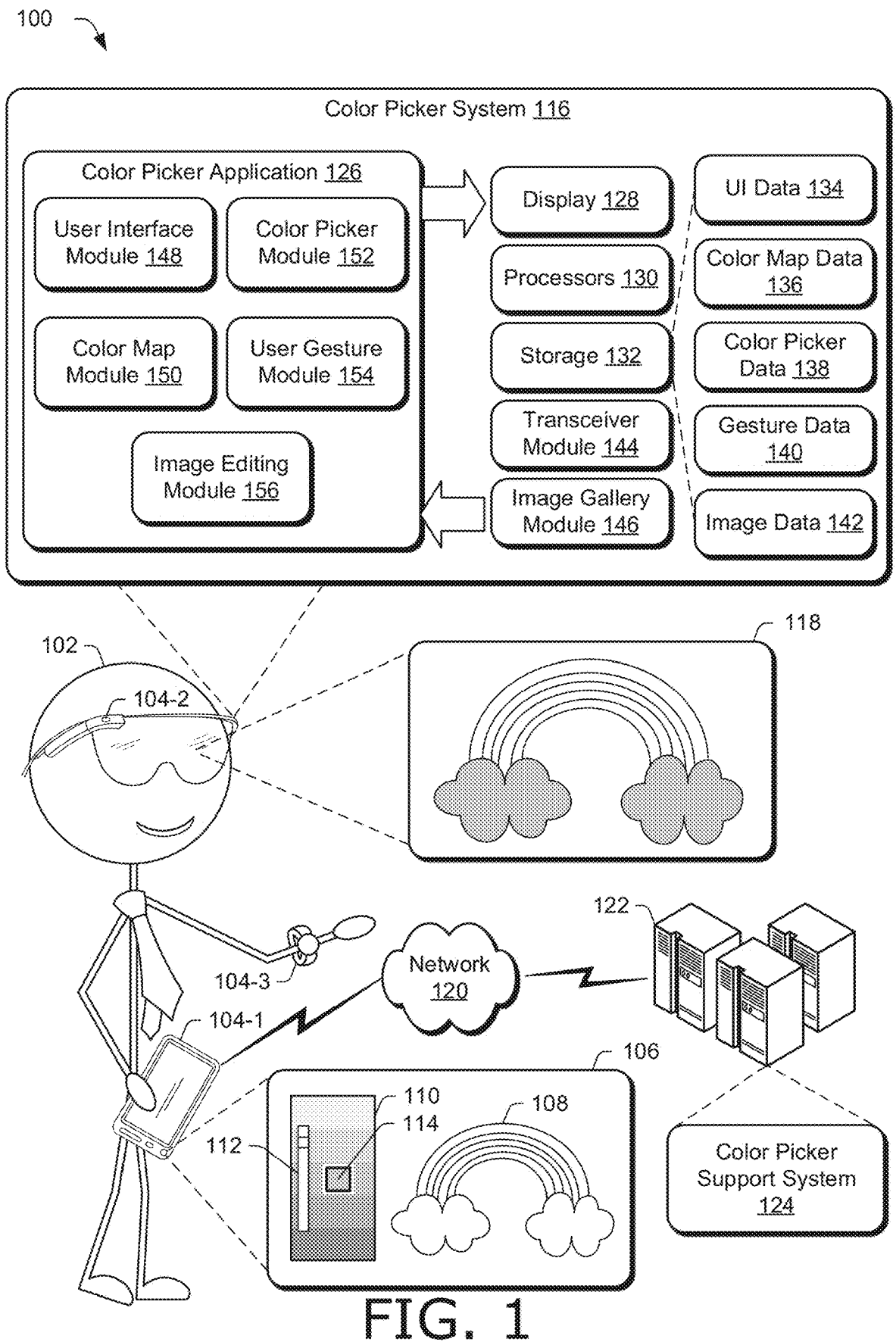
FIG. 1 illustrates a digital medium environment in an example implementation that is operable to employ techniques described herein.

Color pickers used to select a color on a touchscreen, such as a color to be applied to a digital image as part of an image editing process, can limit a user's ability to select an appropriate color because they enable color selection by direct touch of a color from a limited number of colors displayed full-screen on the touchscreen. Because the color pickers are displayed full-screen, they are not displayed in the context of the color adjustment, such as together with the digital image. Moreover, since a color is selected by direct touch of a color exposed by the color map on the touchscreen, a user's finger can obscure the color selection and result in a selected color that is not acceptable to the user. Hence, a user may need to repeat the steps of the color selection process multiple times until an acceptable color is determined, which is inefficient and frustrating for the user.

Accordingly, this disclosure describes systems, techniques, and devices for generating a color picker that is displayed in the context for which the color is to be adjusted, such as part of a user interface that simultaneously exposes the color picker and a digital image whose color is to be adjusted with the color picker. To accommodate a large number of colors (e.g., more colors than can be displayed at any one time on the touchscreen), the color picker depicts a portion of a color map, such as a plane of color. The color picker exposes in the user interface only the portion of the color map that is overlapped by the color picker, and other portions of the color map not overlapped by the color picker remain hidden from the user interface (e.g., they are not exposed in the user interface).

The color picker depicts a window into the color map whose position on the color map and coverage area of the color map can be changed based on a user gesture. For instance, the position of the color picker relative to the color map, and consequently the portion of the color map exposed by the color picker, can be changed based on a user gesture, such as a drag gesture to slide the position of the color picker within the color map or a zoom-in gesture to zoom gesture to change a level of detail of a portion of the color map. For instance, a zoomed-in portion of a color map depicted by a color picker responsive to a zoom-in gesture depicts an area of the color map at a finer level of detail than a portion of the color map depicted by the color picker prior to the zoom-in gesture. Accordingly, a color picker can expose colors with essentially infinite accuracy while remaining in the context of where the color adjustment is to be performed, such as proximate to a digital image.

The color picker includes an indicator of a current color determined by the color picker, such as a circle in the center of the color picker populated with a single color corresponding to a current color. Rather than selecting a current color by touching on it and therefore making it difficult to select the color, a user moves or zooms the color picker relative to a larger color map, such as with drag and zoom gestures, and the indicator is continuously updated to indicate the current color of the color picker during the movement caused by the gesture. The indicator overlaps a position on the touchscreen that determines a current color indicated by a color picker. For instance, a current color indicated by a color picker is determined by a color of a portion of the color map overlapped by the indicator, such as the color of the color map at the center of the indicator, an average of the colors of a portion of the color map overlapped by the indicator, one of multiple colors of a portion of the color map overlapped by the indicator, and the like.

In one example, as a user moves the position of the color picker across the color map, such as back and forth with drag gestures, a current color is continuously determined during the drag gestures and applied to the digital image in real time, with no perceptible delay to the user. Hence, a user can see in real time the color adjustment based upon movement of the color picker within the color map during the user gesture.

The indicator of the current color of the color picker can also include a designator of a previous color. In one example, the indicator is user configurable to include or not include a designator of previous color. A previous color can be determined in any suitable way. In one example, a previous color is user specified, such as from a drop down list of colors or a user-designated portion of a digital image (e.g., a user may select an object in a digital image to be edited and the previous color determined based on the color of the selected object in the digital image). Additionally or alternatively, a previous color may be determined based on a previous position of a color picker within a color map. For instance, a color picker may be at a first position within a color map and indicate a current color of the color map. When a user gesture is received to adjust the color, such as by moving the color picker from the first position, the current color is designated as the previous color and is indicated as the previous color by the color picker when the color picker is moved away from the first position.

For easy comparison, a user interface exposes a designator of previous color proximate the current color indicated by the indicator, such as touching the indicator of the current color. For instance, a designator of previous color may include an annulus encircling a circle indicating a current color. In one example, the designator of the previous color and the indicator of the current color are separated from other colors indicated by the color picker by a separator container, such as one or more separator rings (e.g., nested black and white rings surrounding the indicator and the designator). A separator container ensures that a previous color is represented, even if it is visually similar or identical to the background. For instance, if the previous color was blue, and the current color picker is aligned on blue it could visually seem like there is no designator of previous color (as it blends with the background). The separator container ensures that the previous color is displayed so that it is visually distinguishable from other colors exposed.

Because the entire color map may not be exposed by the color picker in the user interface at any one time, but instead the color picker exposes a user-configurable portion of the color map, the color map can be of any suitable size and content and represent any number of colors, while still supporting color selection in the context of the color adjustment (e.g., with the digital image being adjusted exposed in the user interface proximate the color picker). For instance, the color map may include a high resolution 2D photograph, 1D or 2D color gradient, 3D color space, greyscale, combinations thereof, and the like, whose full spectrum of content could not be displayed at any one time on the user interface, but is accessible via a position and zoom level of a color picker relative to the color map. Accordingly, a large color map including very large color content (e.g., millions or billions of color variations) can be represented by a color picker that depicts a portion of the color map at any one time, and a portion of the color map depicted by the color picker can be changed in a continuous fashion based on user gestures to access any content of the color map. Hence, a user can quickly determine a color with infinite accuracy and without obstruction from the user's finger in the context that the color is to be applied.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device, such as a mobile device with a touchscreen. In the example in FIG. 1, user 102 is illustrated as having three computing devices, computing device 104-1, computing device 104-2, and computing device 104-3 (collectively computing devices 104). For instance, computing device 104-1 depicts a tablet, computing device 104-2 depicts a pair of eye glasses, such as smart goggles, and computing device 104-3 depicts a wearable device, such as a smart wristwatch. Computing devices 104 are example computing devices, and any suitable computing device is contemplated, such as a mobile phone, tablet, laptop computer, desktop computer, gaming device, goggles, glasses, camera, digital assistant, wearable device (e.g., watch, arm-band, adhesive patch, etc.), echo device, image editor, non-linear editor, digital audio workstation, copier, scanner, and the like that may select a color, such as a color of an image to be edited. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, user gestures on a touchscreen, combinations thereof, and the like. Thus, computing devices 104 can recognize multiple types of gestures including touch gestures and gestures provided through a natural user interface. In one example, computing devices 104 include speech recognition, identification, and synthesis functionalities, microphones, and speakers that allow computing devices 104 to communicate with user 102 in a conversation. Moreover, computing devices 104 include an image capture device (e.g., a camera) configured to capture images and video streams.

Figure 13:
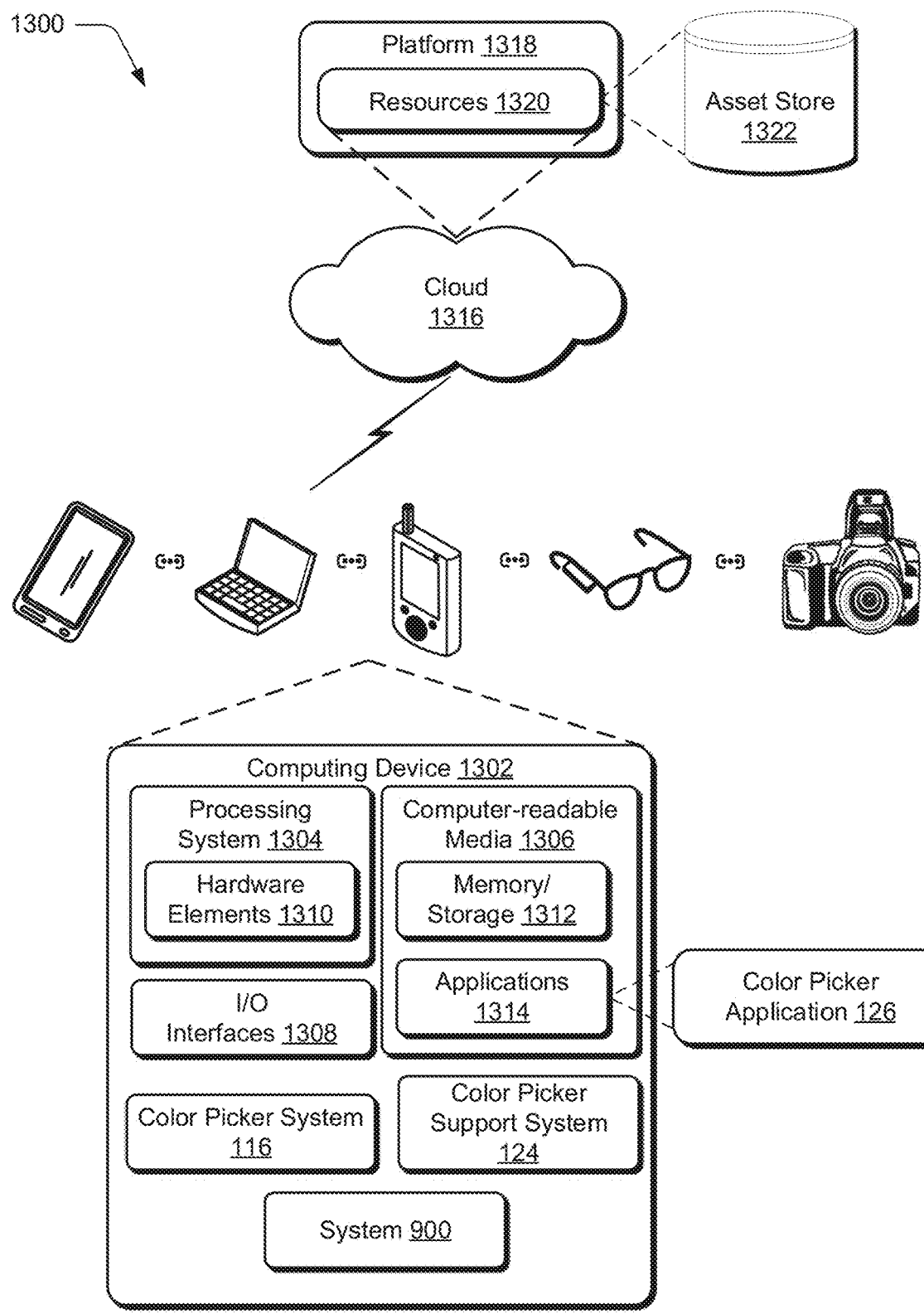
FIG. 13 illustrates an example system including various components of an example device that can be implemented as any type of computing device as described and/or utilized with reference to FIGS. 1-12 to implement aspects of the techniques described herein.

Furthermore, computing devices 104 may be representative of one or a plurality of different devices, such as one or more devices connected to a network that perform operations "over the cloud" as further described in relation to FIG. 13. In one example, computing devices 104 are communicatively coupled to each other, such as with a low power wireless communication standard (e.g., a Bluetooth® protocol). For instance, computing device 104-1 can communicate wirelessly with computing device 104-2. Hence, an image edited on one device (e.g., computing device 104-1) can be communicated to, and displayed on another device (e.g., computing device 104-2).

In the example illustrated in FIG. 1, user 102 obtains a digital image to be edited. For instance, user interface 106, illustrated as a user interface of computing device 104-1, exposes digital image 108 (illustrated in the example as a rainbow). Digital image 108 can be any suitable digital image, such as an image captured by a camera included in one of computing devices 104, a digital image obtained from a database of images, such as stock photographs, a digital image generated from scanning an image captured by a film camera, an image stored in an image library of one of computing devices 104, and the like.

User interface 106 also includes color picker 110 displaying an array of colors (greyscale in the example in FIG. 1). Color picker 110 exposes a portion of a larger color map whose content is accessible via slider 112. For instance, user 102 may provide a gesture to computing device 104-1, such as a swipe gesture on a touchscreen or a voice activated command to cause slider 112 to move and color picker 110 to change content of color map exposed by color picker 110 based on a position of slider 112.

A current color of color picker 110 is exposed in the center square of indicator 114. Indicator 114 is at a fixed position relative to color picker 110, so that as content of color picker 110 is updated (e.g., different portions of a color map are exposed), such as responsive to slider 112 being adjusted, a current color indicated by indicator 114 is also updated. For instance, a current color of indicator 114 may correspond to a color of a color map exposed by color picker 110 that is overlapped by indicator 114 (e.g., a color of a color map at the position on the touchscreen of indicator 114), such as a color of color picker 110 at a position on the touchscreen of computing device 104-1 at the center of indicator 114. Accordingly, a current color can be selected by adjustment of slider 112 without obscuring the current color indicated by indicator 114.

In the example in FIG. 1, a current color indicated by indicator 114 is selected by color picker system 116 as a color to apply to digital image 108. For instance, user 102 may adjust slider 112 to a position and then enable an "accept color" button exposed by user interface 106 (not shown). In one example, color picker system 116 automatically and without user intervention selects a current color indicated by indicator 114 as a color to apply to digital image 108. Color picker system 116 applies a current color indicated by indicator 114 to image 108 to form an image that is exposed by user interface 118 of computing device 104-2. For instance, the clouds of the rainbow in user interface 118 have been adjusted by color picker system 116 to a same color as a current color indicated by indicator 114 in user interface 106.

Though the image of user interface 118 is illustrated in the example of FIG. 1 as having been updated based on a current color indicated by indicator 114, additionally or alternatively digital image 108 of user interface 106 may be updated, such as by adjusting the color of the clouds of digital image 108 to match the color indicated by indicator 114. Additionally or alternatively, digital image 108 can be updated in real time without perceptible delay to user 102 according to a current color indicated by indicator 114. Hence, user 102 can adjust slider 112 to different positions, and color picker system 116 can update digital image 108 in real time so that the user can select a desired color for adjustment of digital image 108 in the context of digital image 108 (e.g., while digital image 108 is exposed by user interface 106 and proximate color picker 110).

Furthermore, the example in FIG. 1 illustrates color adjustment of a digital image. However, color picker system 116 is not limited to color adjustment of digital images. Color picker system 116 can be used to adjust a color of any suitable asset, such as a desktop of a computing device, a document (e.g., text or background of a document), frames of a video or animation sequence, a web page, a user interface, a map, a drawing, a presentation, combinations thereof, and the like.

Computing devices 104 are also coupled to network 120. Network 120 communicatively couples computing devices 104 with server 122 (for clarity, only computing device 104-1 is illustrated in FIG. 1 as coupled to network 120, though computing device 104-2 and computing device 104-3 can also be coupled to server 122 via network 120). Network 120 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 122 may include one or more servers or service providers that provide services and/or resources to computing devices 104. Generally, resources provided by server 122 may be licensed, purchased, or may be made freely available, (e.g., without authentication, license, or account-based access). The resources can include any suitable combination of services and content, such as made available over network 120 by one or more providers. Some examples of services include, but are not limited to, an on-line shopping service, a photo editing service, an image database (e.g., including digital images whose color can be adjusted by color picker system 116), a web development and management service, a collaboration service, a social networking service, a messaging service, an advertisement service, a graphics design service, a color map service providing color maps, an image storage service (including storage and access of photos, documents, records, files, and the like), and so forth. Content may include various combinations of assets, including videos, ads, audio, multi-media streams, animations, images, color maps, web documents, web pages, applications, device applications, text documents, drawings, presentations, stock photographs, user profiles, user preferences, user data (e.g., images stored in an image gallery), and the like.

Server 122 includes color picker support system 124 configurable to receive signals from computing devices 104, process the received signals, and send the processed signals to computing devices 104 to support color selection with a color picker, such as for color adjustment of a digital image. For instance, computing device 104-1 may obtain digital image 108 and receive a user request from user 102 indicative of a color adjustment (e.g., via slider 112) to be made to digital image 108. Computing device 104-1 may communicate an indication of digital image 108, such as an identification number of digital image 108 in a database, or digital image 108 itself, or both, to server 122 together with an indication of the current color determined by color picker system 116 and indicated by indicator 114, such as a location on a color map corresponding to the current color (e.g., a grid coordinate). Color picker support system 124 can receive the indication of digital image 108 and indication of the current color determined by color picker system 116 and generate an updated digital image by applying the current color to digital image 108, such as in a region of digital image 108 indicated by user 102. Color picker support system 124 can communicate the updated digital image to one or more of computing devices 104 for display, such as for display in user interface 118. Accordingly, color picker support system 124 of server 122 can include a copy of color picker system 116, including color picker application 126 (discussed below in more detail).

Computing devices 104 include color picker system 116 to generate a color picker for selection of a color in the context of color adjustment, such as by exposing a color picker proximate a digital image whose color is to be adjusted. For clarity, computing device 104-2 is illustrated in FIG. 1 as including color picker system 116, though computing device 104-1 and computing device 104-3 also include copies of color picker system 116 (not shown).

Color picker system 116 includes a display 128 for exposing user interfaces including digital images and color pickers, such as digital image 108 and color picker 110, respectively. Display 128 can be any suitable type of display, such as a liquid crystal display, plasma display, head-mounted display, projector and screen, a touchscreen that recognizes user gestures (e.g., touch gestures), and the like. A touchscreen of display 128 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Moreover, display 128 can display any suitable interface, such as user interface 106 and user interface 118.

Color picker system 116 also includes processors 130. Processors 130 can include any suitable type and number of processors. Hence, color picker system 116 may be implemented at least partially by executing instructions stored on storage 132 on processors 130. For instance, processors 130 may execute portions of color picker application 126.

Storage 132 can be any suitable type of storage accessible by or contained in color picker system 116. Storage 132 stores and provides access to and from memory included in storage 132 for any suitable type of data. For instance, storage 132 includes user interface data 134 (e.g., data associated with user interfaces that display color pickers, such as user preferences (e.g., font size and style, locations and sizes of panels presented in a user interface, indicators of color maps used by, or preferred by users, and the like), data of users operating a user interface (e.g., user histories of edits including color adjustments made by users), user interface configurations (e.g., different layouts, language options, etc.), controls and adjusters (e.g., sliders, lists of user gestures to control a user interface, etc.), options for color indicators, such as circles, rings, squares, triangles, and the like used to indicate a current color, a previous color, or a separator container, user interface version numbers, lists of operating systems supported by various user interfaces, thumbnail images of color maps to display in a user interface, toolbar icons, speech libraries for voice-actuated commands and gestures, and the like).

Storage 132 also includes color map data 136, including data regarding color maps used by color picker system 116, such as a database of color maps, identifiers of color maps, such as unique identification numbers for locating color maps in a database of color maps, e.g., a database of color maps maintained by server 122, sizes of color maps (e.g., numbers of pixels, file size, number of colors represented by a color map, etc.), numbers of dimensions represented by a color map, such as 1D, 2D, or 3D, indicators of color space dimensions represented by a color map, such as hue, saturation, lightness, and value, metadata of a color map, such as a date a color map was generated or captured, configuration settings of a device used to generate or capture a color map, such as aperture, shutter speed, indicator of light sensitivity, processor speed, etc., a default current color of the color map, such as used to position a color picker on a color map for a default display of a user interface including the color picker indicating the default current color, and the like.

Storage 132 also includes color picker data 138 including data regarding color pickers used by color picker system 116, such as a portion of a color map overlapped by a color picker that is depicted by the color picker, a location on a color map of a position of a color picker, such as coordinates of corners of the color picker on a larger color map, a size (e.g., coverage area) of a portion of a color map overlapped by a color picker that is depicted by the color picker, an indicator of a color map having content depicted by a color picker, configuration options for a color picker, such as sliders, adjusters, lists of gestures, etc. used to adjust a color picker position or size relative to a color map, configuration controls for accessing a third dimension of a color map, such as a slider to adjust saturation when a color picker depicts a color plane in other dimensions, such as hue versus brightness, user interface controls such as undo, cancel, accept, and redo, an indicator of a current color, a designator of a previous color, separator containers for visually separating an indicator of a current color displayed on a color picker from other content of the color picker, and the like.

Storage 132 also includes gesture data 140 including data regarding user gestures received by color picker system 116, such as lists of user gestures and their associated meanings, e.g., a pinch-in gesture corresponds to a zoom-out request and a pinch-out gesture corresponds to a zoom-in request, thresholds of user gestures, such as a threshold amount of contact that must be sensed by a touchscreen to determine a valid touch gesture, a history of user gestures, such as a table of user gestures received for specific users that can be used to configure color picker system 116 when one of the specific users is identified as the operator of color picker system 116, data indicative of an adjustment request of a received user gesture, such as touch controller data from a touchscreen indicating a trajectory, contact area, pressure, etc. of a touch gesture on the touchscreen, distance of movement of a pinch gesture, distance of a swipe gesture, combinations thereof, and the like.

Storage 132 also includes image data 142 including data regarding digital images used by color picker system 116, such as digital images whose color is to be adjusted by color picker system 116, digital images used as color maps by color picker system 116, a history of digital images that have processed by color picker system 116, such as digital images that have had their color adjusted, features of digital images, such as content features identified by a user, identified by color picker system 116 (e.g., automatically and without user intervention), and combinations thereof, indicators of features in a digital image that have had their color adjusted (e.g., a feature having its color adjusted may be tagged in a user interface with a text tag, bounding box, and the like), indicators of features in a digital image that have not had their color adjusted (e.g., a feature not having its color adjusted may be outlined, such as with a dashed line), indicators of colors of features in a digital image (e.g., text names and descriptors of colors, such as "red, fire-engine"), and the like.

Furthermore, color picker system 116 includes transceiver module 144. Transceiver module 144 is representative of functionality configured to transmit and receive data using any suitable type and number of communication protocols. For instance, data within color picker system 116 may be transmitted to server 122 with transceiver module 144. Furthermore, data can be received from server 122 with transceiver module 144. Transceiver module 144 can also transmit and receive data between computing devices 104. In one example, transceiver module 144 includes a low power wireless communication standard (e.g., a Bluetooth® protocol) for communicating data between computing devices 104.

Color picker system 116 also includes image gallery module 146. Image gallery module 146 is representative of functionality configured to obtain and manage images of color picker system 116, such as images whose color can be adjusted, images used as color maps, thumbnail representations displayed in a user interface (e.g., thumbnail images of color maps exposed in a user interface), and the like. Hence, image gallery module 146 may use transceiver module 144 to obtain any suitable data from any suitable source, including obtaining digital images from a user's directory of files on computing devices 104 or server 122, obtaining images from a user's photo gallery (e.g., an online photo sharing service, images stored in a user's image editing application, such as Photoshop®), images a user has posted in a social media post, blog, online comment, and the like, images a user has attached to an email, text, or other communication sent from or received by computing devices 104, images provided by a search service, such as an online search for digital images related to a search query, images obtained from a database of stock images, images provided by user 102, images captured by a computing device, such as with a camera integrated into one of computing devices 104, and the like. Images obtained by image gallery module 146 are stored in image data 142 of storage 132 and made available to modules of color picker application 126.

Color picker system 116 also includes color picker application 126. Color picker application 126 includes user interface module 148, color map module 150, color picker module 152, user gesture module 154, and image editing module 156. These modules work in conjunction with each other to generate a color picker and a user interface including the color picker for color adjustment of a digital image in the context of the digital image.

Furthermore, though the description of color picker system 116 and color picker application 126 describes adjusting color of digital images, the systems, procedures, and devices described herein are not limited to adjusting color of digital images, but are also operable to adjust patterns, textures, opacity, an amount of a filter (e.g., a sepia filter, "vintage" filter, etc.), and the like. For instance, a color map may indicate an amount of opacity in one dimension, from zero (e.g., translucent) to one hundred percent (e.g., opaque), and an amount of a sepia filter applied in another dimension, from zero (e.g., no sepia effect applied) to one hundred percent (e.g., full sepia effect applied). In one example, color picker system 116 and color picker application 126 can be used to adjust color of vector images (including text), such as by selecting the fill or outline color of a vector object, or to select the color stops of a gradient fill. Additionally or alternatively, color picker system 116 and color picker application 126 can be used to select parts of an image based on color.

Furthermore, though the description of color picker system 116 and color picker application 126 describes adjusting color of digital images, the systems, procedures, and devices described herein are not limited to adjusting color of digital images, but are also operable to adjust patterns, textures, opacity, an amount of a filter, and the like of videos (e.g., on a frame-by-frame basis, or applied to groups of multiple frames), scans, copies, documents, animations, cartoons, and the like.

User interface module 148 is representative of functionality configured to generate, manage, and cause display on any suitable display of a user interface including a digital image and a color picker for the digital image. In one example, user interface module 148 generates a user interface including a digital image and a color picker for the digital image for display on a touchscreen, such as a touchscreen on a mobile device.

A user interface of user interface module 148 exposes a color picker for color adjustment of a digital image in the context of the digital image. For instance, rather than exposing a color picker full-screen and without a portion of the digital image viewable, a user interface of user interface module 148 is exposed on a display (e.g., a touchscreen) with at least part of the digital image being viewable while the color picker is exposed. Hence, as the color picker is adjusted, such as by moving the color picker relative to a larger color map, a current color of the color picker is updated and indicated by the color picker, such as by indicator 114, while the digital image is viewable. Accordingly, the color picker is exposed in the context for the color adjustment, making it easier for a user to visualize the effect of updating the color of the digital image than full-screen color pickers that are exposed out of the context for the color adjustment (e.g., without the digital image exposed).

User interface module 148 manages user interfaces by updating the user interfaces according to user gestures indicative of adjustment requests, such as requests to adjust a current color of a color picker. In one example, a user interface of user interface module 148 exposes a color picker and a digital image simultaneously, and applies a current color to the digital image exposed in the user interface in real time without perceptible delay to a user. For instance, a user may adjust a position of a color picker exposed in a user interface of user interface module 148 relative to a color map and cause the color picker to update the content exposed by the color picker, including the current color. The current color, as it is updated in the color picker, is applied to the digital image exposed in the user interface in real time without perceptible delay to a user.

Furthermore, a user interface of user interface module 148 exposes a color picker including an indicator of current color, such as indicator 114, and facilitates adjustment of the current color in a manner that does not obscure the current color indicated by the indicator. For instance, rather than directly touching the color on the color picker, a current color is determined by a position of the indicator of the color picker on the touchscreen. The indicator overlaps a position on the touchscreen of the current color of the color picker. The indicator is at a fixed position relative to the color picker, such as the center of the color picker. Hence, a user can change the content of a color map exposed by a color picker, such as with pan and zoom gestures on the touchscreen, without obscuring the indicator of current color by touching the indicator of current color.

In one example, the fixed position of an indicator of a current color relative to the color picker is user configurable, such as including options to set the indicator at a center of the color picker, a corner of the color picker, a region of the color picker (e.g., top left, top center, etc.), and direct placement of the indicator on the color picker. For instance, a user may select an option to manually designate a fixed position and responsive to selecting this option, be presented a color picker and adjustable cross hairs to position on the color picker and set a location on the color picker to designate as the fixed position, such as by moving the cross hairs with a drag gesture to the location and tapping on the cross hairs at the location with a tap gesture.

A user interface of user interface module 148 can expose any suitable data, such as options for selecting color maps, including lists of color maps and thumbnail images of color maps. In one example, a user interface of user interface module 148 exposes thumbnail images of color maps not currently used by a color picker (e.g., different color maps than a color map whose contents are exposed by the color picker). A user can select a thumbnail image of a color map and cause the selected color map to be applied to the color picker, so that the color picker is updated to expose content of the color map selected from a thumbnail image.

In one example, a user interface of user interface module 148 exposes thumbnail images of portions of content of a color map that are not currently exposed by a color picker that exposes other portions of content of the color map. For instance, thumbnail images may depict a portion of a color map from an opposite side of the color map than is currently exposed by the color picker, or include content from a different dimension than is currently exposed by the color picker. A user can select a thumbnail image of a portion of the color map and cause the color picker to expose the selected portion of the color map. Hence, the position of the color picker relative to the color map can be quickly updated by user selection of a thumbnail image.

A user interface generated by user interface module 148, along with any suitable information, such as configurations settings of the user interface, user gestures, positions of a color picker relative to a color map, a size of a portion of a color map exposed by a color picker, thumbnail images of color maps, user preferences, such as preferred locations of color pickers and digital images exposed in a user interface, and the like, used by or calculated by user interface module 148 are stored in user interface data 134 of storage 132 and made available to modules of color picker application 126. In one example, a user interface generated by user interface module 148 is displayed on a touchscreen of display 128.

Color map module 150 is representative of functionality configured to obtain color maps. Color map module 150 can obtain any suitable color map in any suitable way. In one example, color map module 150 obtains color maps from a database of color maps, such as a database maintained by server 122. Additionally or alternatively, color map module 150 obtains color maps as digital images from a database of digital images, such as a database of stock images maintained by server 122. Hence, a color map obtained by color map module 150 can include at least one image, such as a high-resolution digital photograph. In one example, color map module 150 obtains a color map including a representation of the color map, such as a thumbnail image, that can be displayed in a user interface of user interface module 148. Additionally or alternatively, a user may supply a color map to color map module 150, such as by loading a file including a plurality of color maps into color picker system 116 (e.g., into storage at color map data 136).

A color map obtained by color map module 150 may include metadata, such as a source of a color map (e.g., a database name and location where the color map is stored, a photographer's name who captured an image, a computer application used to generate the color map, and the like), a date a color map was created, a size of a color map (number of pixels, file size, number of lines of code for generating a color map, a number of colors represented by the color map), statistics of the color map, such as variance of the content of the color map, a measure of compactness of the content of the color map, such as a ratio of statistical moments, a compression ratio of the color map, and the like.

In one example, color map module 150 obtains a color map by generating a color map. For instance, a user interface generated by user interface module 148 may include user selectable parameters for generation of a color map, such as a starting frequency and a stopping frequency of colors in a ramp of colors having spectral content between the starting and stopping frequencies, coordinates of a portion of an image that can be cropped to generate a color map, a designator of a pure color (e.g., "red") and a dimension of a color space for the pure color, such as saturation of the pure color, options for fade (e.g., fade to black or fade between black and white in one dimension) to apply to a color map, combinations thereof, and the like.

Additionally or alternatively, color map module 150 may obtain a color map according to a user selection of a color map. For instance, a user interface generated by user interface module 148 may include a list of color maps, such as a drop-down list of user-selectable color maps. A user may select a color map from the list, and responsive to the selection, color map module 150 may obtain the selected color map, such as from memory (e.g., local memory of storage 132), a database maintained by a server, such as server 122, and the like. Additionally or alternatively, responsive to a user selection of a color map, color map module 150 may generate the selected color map. A user selection of a color map may include an indication of other user parameters, such as a user selection of a previous color to indicate in a color picker together with content of the selected color map, an indicator of whether a previous color is to be indicated, a selection of a type of indicator current color (e.g., indicator 114), such as a square, circle, rectangle, and the like.

A color map obtained by color map module 150 can be any suitable type of color map. In one example, a color map includes a high-resolution image of the color map, such as pixel data of an array of colors, such as a rainbow or ramp of colors. Additionally or alternatively, a color map obtained by color map module 150 includes a digital image, such as a high-resolution digital photograph (e.g., a photograph of a sunset).

In one example, a color map obtained by color map module 150 can include instructions for generating the color map, such as frequencies of colors in a color map (e.g., start and stop frequencies, center frequencies), a slope of a ramp of colors in a color map, parameters of a fade, such as parameters controlling a fade from black to white in a color map, locations for inserting a greyscale ramp into a color map, and the like. In one example, instructions for generating a color map include vector graphics instructions, indicating a mathematical (e.g., procedural) description of generating a color map. Additionally or alternatively, instructions for generating a color map can include a look-up table to generate a color map. In one example, a color map includes a raster graphic.

A color map obtained by color map module 150 may represent colors in any suitable number of dimensions. In one example, color is changed in one dimension, such as a ramp of colors, and a color map represents this change of colors in a plane in which one dimension depicts the color change and the orthogonal dimension depicts no change in color. In another example, color is changed in two dimensions, such as a ramp of colors and a fade to black, and a color map represents this change of colors in a plane in which one dimension depicts the first color change (e.g., the color ramp) and the orthogonal dimension depicts the second color change (e.g., the fade to black). Furthermore, a color map obtained by color map module 150 may represent a 3D color space, such as having dimensions according to the triplets (hue, saturation, lightness), (hue, saturation, value), (hue, saturation, brightness), (red, green, blue), combinations thereof, and the like.

A color map obtained by color map module 150, along with any suitable information, such as representations of color maps (e.g., thumbnail images), a source of a color map (e.g., a database name and location where the color map was obtained), an indication of whether the color map was generated responsive to a user selection, metadata of a color map, a size of a color map (number of pixels, file size, number of lines of code for generating a color map, and the like), instructions for generating a color map, an indication whether a color map includes 1D, 2D, or 3D content, and the like used by or calculated by color map module 150 are stored in color map data 136 of storage 132 and made available to modules of color picker application 126. In one example, a color map obtained by color map module 150 is provided to color picker module 152 to determine content exposed by a color picker and a current color of the color picker.

Color picker module 152 is representative of functionality configured to generate a color picker. Color picker module 152 determines content depicted by the color picker including a portion of a color map and an indicator of a current color of the color picker, such as indicator 114. Content depicted by a color picker generated by color picker module 152 corresponds to a portion of a color map. The content of the color map exposed by the color picker is changed by moving the location of the color picker relative to the color map, the size of the area of the color map overlapped by the color picker (e.g., exposed by the color picker), and combinations thereof, responsive to receiving a user gesture, such as a pan, drag, zoom-in, and zoom-out touch gesture on a touchscreen. Hence, a color picker of color picker module 152 acts as a window into a larger color map. At any one time, the color map includes content exposed in a user interface by the color picker, and other content not overlapped by the color picker that is consequently not exposed by the color picker in the user interface.

A color picker generated by color picker module 152 also includes an indicator of a current color, such as indicator 114. An indicator of a current color is at a fixed position relative to the color picker, such as in the center of the color picker. In one example, the fixed position is user selectable, such as according to a table of preset positions or via a mechanism that allows a user to select a location of the color picker for the fixed position of the indicator of current color, such as with a tap gesture on a location of the color picker.

A color picker may include a designator of a previous color. In one example, an indicator of current color of a color picker includes a designator of a previous color. A previous color may be determined by color picker module 152 in any suitable way, such as based upon a user selection (e.g., a selection of a color map in a drop-down list of color maps that also includes a previous color, such as "rainbow+blue" to select a rainbow color map and a blue previous color, a user selection on a color picker of a color to designate as a previous color, a user selection of an object in an image having the previous color, a user selection of a previous color in a list of previous colors, combinations thereof, and the like).

Additionally or alternatively, a previous color may be determined by color picker module 152 based on a previous portion of a color map exposed by a color picker. For instance, a user may move a location of a color picker within a color map to a first position, and color picker module 152 may set a current color of the color picker at the first position according to the location of the color picker within the color map. A user may initiate a move from the first position to a second position, such as with a swipe gesture. Responsive to receiving the user gesture to move from the first position to the second position, color picker module 152 may set the current color determined at the first position as the previous color before executing the movement. Hence, when color picker module 152 updates the color picker at the second position, not only is the color picker updated to expose the content of the color map at the second position, but the indicator at the second position indicates as a previous color the color that was indicated as a current color at the first position.

Furthermore, responsive to receiving a user gesture indicative of a request for adjusting a color picker within a color map, color picker module 152 updates the color picker based on the request. For instance, color picker module 152 adjusts the color picker within the color map, such as by translating a position of the color picker within the color map, zooming the color map to include more or less content, and combinations thereof, and causes the color picker to depict a different portion of the color map. Color picker module 152 updates an indicator of current color to indicate an updated color based on a color of the different portion of the color map at the position of the indicator on the touchscreen.

A color map can be represented by any suitable geometry in any suitable dimensions, and a color picker moved relative to the geometry. In one example, a color picker is represented as a 2D plane projected from a geometry of color space representing a color map. For instance, a 2D plane may be generated by projecting from a cube of color space representing a color map to a plane in two dimensions of the color space. Hence, the projection is a parallel projection. Additionally or alternatively, a color space representing a color map may be represented by a sphere of colors, such as having brightness represented on an axis of the sphere, hue represented by rotation about the axis, and chroma represented as distance from the axis. A 2D plane representing a color picker may be generated by projecting from the sphere of color space to a plane using a spherical projection, rather than parallel projection. In one example, a 2D plane representing a color picker is generated from a color space by projecting from the color space to the 2D plane through a filter or lens that distorts the projection, such as a fish-eye lens that magnifies the center of the projection. Hence, more detail may be shown at the center of a color picker, near an indicator of current color, than at the edges of the color picker. Furthermore, a color picker can be moved relative to the geometry of a color map in any suitable, such as by sliding a color map across a plane, rotating a color map around a sphere, and the like.

A color picker generated by color picker module 152, along with any suitable information, such as a current color, a previous color, locations of a color picker within a color map, a portion of a color map overlapped by a color picker, a size of a portion of a color map overlapped by a color picker, a zoom level of a color picker within a color map, configurations for indicators of current color, designators of previous color, separator containers, and the like used by or calculated by color picker module 152 are stored in color picker data 138 of storage 132 and made available to modules of color picker application 126. In one example, a portion of a color map overlapped by a color picker (e.g., content of the color map exposed by the color picker) and a current color of the color picker are provided to user interface module 148 for display in a user interface as part of a color picker.

User gesture module 154 is representative of functionality configured to receive a user gesture. In one example, a user gesture received by user gesture module 154 is indicative of a request for adjusting the current color, such as by adjusting a color picker within a color map (e.g., by moving a position of a color picker within a larger color map, zooming in or out of the color map, or combinations thereof). Accordingly, user gesture module 154 can receive a user gesture on a touchscreen for changing a portion of a color map depicted by a color picker. User gesture module 154 may determine an adjustment request according to the received user gesture, such as a distance to move a color picker within a color map, a position of a color picker on a color map, a zoom level of a color picker on a color map, and the like.

User gesture module 154 can receive any suitable type of gesture, such as a pan gesture (e.g., a user touches a touchscreen with a finger and swipes the touchscreen with the finger remaining on the touchscreen, such as by moving the user's finger), a pinch-in gesture (e.g., a user moves two or more fingers towards each other), a pinch-out gesture (e.g., a user moves two or more fingers away from each other), and the like. In one example, responsive to user gesture module 154 receiving a pan gesture, color picker module 152 slides a color picker along a direction of a color map. A distance the color picker slides within the color map can be based on the magnitude of the pan gesture, such as the length of a swipe of a pan gesture. Additionally or alternatively, responsive to user gesture module 154 receiving a pinch-out gesture, color picker module 152 zooms-in content of a color map exposed by a color picker (e.g., more detail of the content is exposed responsive to the pinch-out gesture, though less content may be exposed). Additionally or alternatively, responsive to user gesture module 154 receiving a pinch-in gesture, color picker module 152 zooms-out content of a color map exposed by a color picker (e.g., less detail of the content is exposed responsive to the pinch-in gesture, though more content may be exposed).

In one example, meanings of user gestures received by user gesture module 154 are user configurable. For instance, a user may configure user gesture module 154 to interpret a three-finger gesture, such as a swipe or pan of three fingers simultaneously, to indicate that a third dimension of a color map is to be exposed by a color picker. For instance, if a color map represents a color space in three dimensions, and a color map currently exposes content of the color map in two of the three dimensions, user gesture module 154 can be configured to interpret a three finger-finger gesture as a request to expose content of a third dimension in the color picker. In one example, responsive to receiving a three-finger gesture by user gesture module 154, color picker module 152 changes one of the two dimensions exposed in a color picker to the third dimension. Additionally or alternatively, responsive to receiving a three-finger gesture by user gesture module 154, color picker module 152 exposes content in the first two dimensions for different values of the third dimension determined by the three-finger gesture. In one example, a user may configure user gesture module 154 to interpret a gesture, such as a three-finger gesture, to indicate a request to undo a previous gesture and thereby reposition a color picker within a color map to a previous position, previous zoom level, or combinations thereof, including to update the current color to a previously indicated current color.

A user gesture received by user gesture module 154, along with any suitable information, such as touch data (e.g., contact area, touch trajectory, number of fingers of a touch, and the like), an adjustment request corresponding to the user gesture (e.g., a position and zoom level to adjust a color picker within a color map), user configuration settings for gestures, such as meanings of gestures set by a user, a user history of user gestures, and the like used by or calculated by user gesture module 154 are stored in user gesture data 140 of storage 132 and made available to modules of color picker application 126. In one example, an adjustment request corresponding to a user gesture is provided to color picker module 152 to adjust the content of a color map exposed by a color picker of color picker module 152.

Image editing module 156 is representative of functionality configured to edit images, such as by applying a color to at least part of a digital image. Applying a color can include removing an old color of a digital image and replacing the old color with the color to apply. In one example, image editing module 156 applies a current color indicated by a color picker, such as a current color of indicator 114, to a digital image. For instance, a user may adjust a color picker by moving and zooming a color picker within a color map until the color picker indicates an acceptable user color. The user may then select an option to apply the current color to the digital image, such as an "apply current color" button in a user interface.

Additionally or alternatively, image editing module 156 can apply a current color of a color picker to a digital image automatically and without explicit user instruction to apply the current color to the digital image. For instance, a user may adjust a color picker my moving and zooming a color picker within a color map, and responsive to the adjustment by the user, image editing module 156 may continuously apply a current color of the color picker to the digital image during the adjustment, without the user having to select an "apply current color" button in a user interface.

In one example, image editing module 156 includes a feature extractor, such as for extracting content features from a digital image, e.g., digital image 108. Image editing module 156 can include any suitable feature extractor. In one example, content features are extracted with a rotationally-invariant feature descriptor, such as an oriented-fast and rotated-brief (ORB) descriptor. Additionally or alternatively, image editing module 156 can extract content features with a scale-invariant feature transform (SIFT), speeded-up robust features (SURF), an edge detector, a corner detector, a blob detector, a color detector, a texture detector, combinations thereof, and the like. In one example, image editing module 156 extracts features of a digital image, and a user interface of user interface module 148 displays designators of the features extracted by image editing module 156, such as text labels (e.g., "clouds" and "rainbow" labels for the features of digital image 108), boundaries of the features, such as dashed lines around the features, combinations thereof, and the like. Designators of the features can include a description of a color of a feature, such as text box including a color name, closest pure color, a distance measure of a color of a feature from a closest pure color, temperature value, saturation value, combinations thereof, and the like.

Additionally or alternatively, image editing module 156 can facilitate user selection of a content feature of a digital image. For instance, a user may draw with a drawing tool of image editing module 156 or a finger around an object, and tap on the object to designate a content feature of a digital image. In the example in FIG. 1, user 102 has selected the clouds of digital image 108 to be color adjusted, such as by drawing around the clouds and tapping at the center of the clouds. Hence, user interface 118 depicts the clouds colored according to a current color of color picker 110.

An image edited by image editing module 156, along with any suitable information, such as content features extracted from a digital image, a color selected for adjustment of a digital image, a color of a feature of a digital image replaced by a color of a color picker, a position of a color that is applied to a digital image within a color map, a color map used to select a color applied to a digital image, and the like used by or calculated by image editing module 156 are stored in image data 142 of storage 132 and made available to modules of color picker application 126. In one example, a digital image whose color is adjusted by image editing module 156 is provided to a touchscreen for display, such as part of a user interface generated by user interface module 148.

Having considered an example digital medium environment, consider now a discussion of example user interfaces including example color pickers in accordance with one or more aspects of the disclosure.

Example User Interfaces and Example Color Pickers

Figure 2:
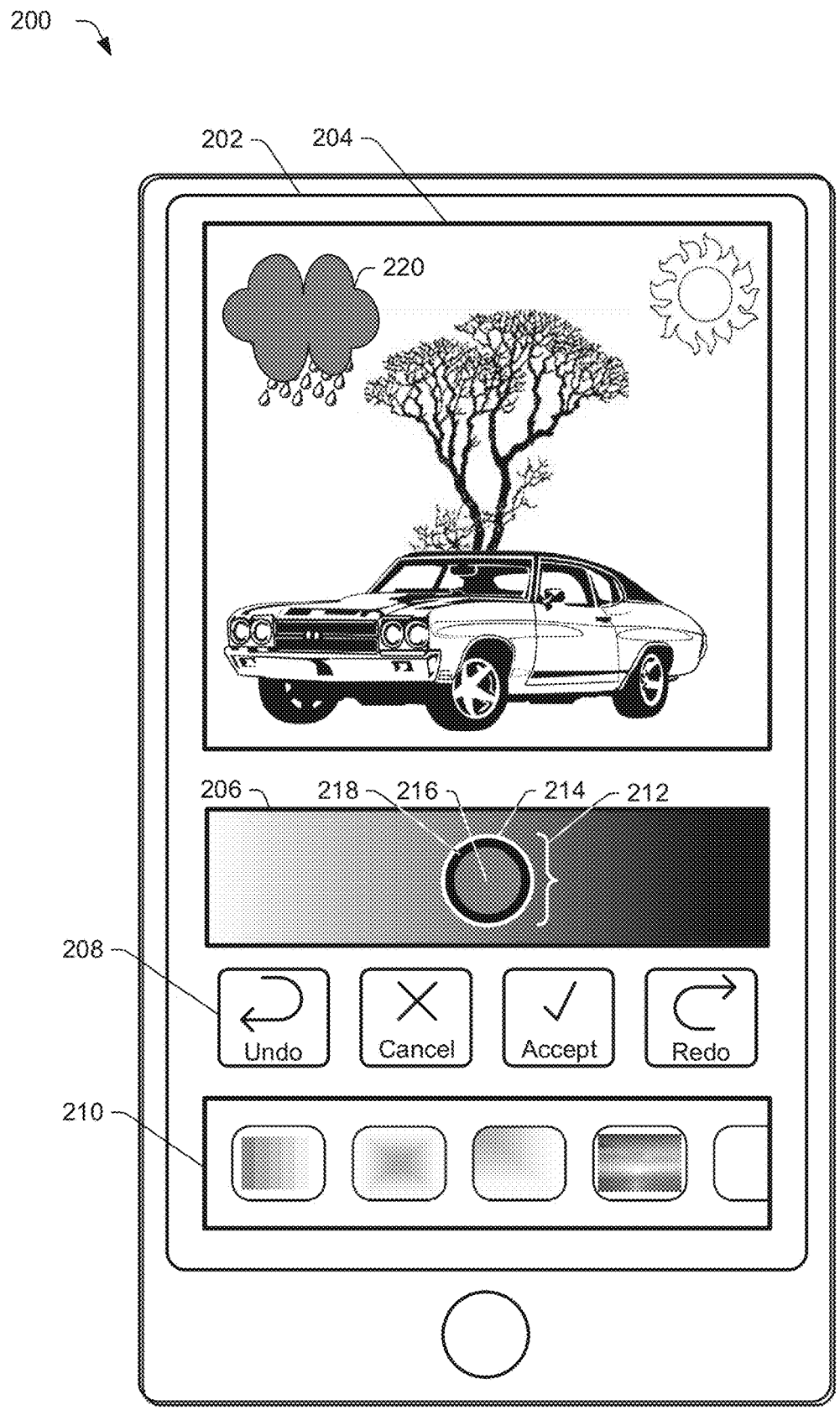
FIG. 2 illustrates an example mobile device depicting an example user interface in accordance with one or more aspects of the disclosure.

FIG. 2 illustrates an example mobile device 200 depicting an example user interface 202 in accordance with one or more aspects of the disclosure. For instance, user interface 202 may be displayed on a touchscreen of mobile device 200. Mobile device 200 is an example of one of computing devices 104 in FIG. 1. User interface 202 exposes digital image 204. Digital image 204 is an example of an image displayed for color adjustment. User interface 202 also exposes color picker 206, control buttons 208, and toolbar 210. User interface 202 exposes color picker 206 proximate to digital image 204, rather than exposing color picker 206 in a full-screen mode. Hence, color adjustments can be made using color picker 206 in the context of where the color is adjusted (e.g., with at least part of digital image 204 viewable in user interface 202).

Components of user interface 202 (e.g., color picker 206, control buttons 208, and toolbar 210) are illustrated in FIG. 2 at example positions within user interface 202, and can be located within user interface 202 at any suitable position and be of any suitable size. For instance, a user may drag color picker with a touch and drag gesture to reposition color picker 206 within user interface 202, such as on top of digital image 204 (e.g., overlapping part of digital image 204). Additionally or alternatively, a user can resize any component of user interface 202. For instance, a user may select a corner of color picker 206 with a touch gesture and drag the corner in a diagonal motion to resize color picker 206.

Color picker 206 exposes a portion of a color map, illustrated in FIG. 2 as a plane including a color gradient in greyscale from light on the left transitioning to dark on the right. Color picker 206 also includes indicator 212, an indicator of current color. In the example in FIG. 2, indicator 212 includes separator ring 214, circle 216 filled with a current color of indicator 212, and previous color ring 218 indicating a previous color.

Current-color indicator 212 is at a fixed position of color picker 206 (e.g., the center of color picker 206). Hence, as color picker 206 is moved or resized within user interface 202, indicator 212 is moved together with color picker 206 so that indicator 212 remains at a fixed position of color picker 206, such as in the center of color picker 206.

Circle 216 is filled with a single color indicating a current color of color picker 206. A current color of color picker 206 can be determined in any suitable way. In one example, a current color of color picker 206 is determined from the color of color picker 206 overlapped by indicator 212 at the center of indicator 212. Additionally or alternatively, a current color of color picker 206 can be determined based on multiple colors of color picker 206 that are overlapped by indicator 212, such as an average of colors of color picker 206 that are overlapped by indicator 212. In one example, colors are averaged by averaging a parameter of colors of color picker 206 that are overlapped by indicator 212, such as averaging a saturation, brightness, or fade parameter to determine a single parameter for determining a current color indicated by indicator 212. An average can include a weighted average, such as having weights determined by a distance of a color from a center position of indicator 212. In one example, colors further from the center position of indicator 212 are given less weight in an average used to determine a current color of color picker 206 than colors closer to the center position of indicator 212.

In the example in FIG. 2, a current color indicated by indicator 212 and filled in circle 216 is applied to digital image 204. For instance, digital image 204 includes cloud 220 that has a color adjusted according to a current color of indicator 212. Cloud 220 represents a feature of digital image 204 (e.g., a content feature) and can be determined in any suitable way. In one example, color picker application 126 automatically determines features of an image (e.g., with a neural network trained to extract specific features, such as backgrounds, clouds, people, etc.). Additionally or alternatively, features of an image are determined by a user selection, such as a user selection of cloud 220 (e.g., by a user tapping on cloud 220, drawing an enclosure with a touch gesture around cloud 220, combinations thereof, and the like).

In one example, digital image 204 is color adjusted by applying a current color of color picker 206 to digital image 204 responsive to a user selection to apply the current color to digital image 204, such as by a user selecting an "accept" button of control buttons 208. For instance, a color of cloud 220 may be changed to a current color of indicator 212 responsive to a user selection of one of control buttons 208. Additionally or alternatively, a color of cloud 220 may be changed to a current color of indicator 212 responsive to color picker determining the current color indicated by indicator 212. For instance, color picker may be updated to expose another portion of a color map or another color map, and the current color of indicator 212 updated responsive to the content of color picker 206 being updated. Digital image 204 may update a color of digital image 204, such as a color of cloud 220, responsive to color picker exposing different content and updating its current color indicated by indicator 212.

Previous color ring 218 of indicator 212 is used to designate a previous color. A previous color of color ring 218 can be designated in any suitable way. In one example, previous color of color ring 218 is determined from a color of digital image 204. For instance, a user may select an object of digital image 204, such as the car, tree, clouds, sun, or background illustrated in the example in FIG. 2, and a previous color of color ring 218 may be set from a color of the selected object (e.g., a color of the car's paint when the car is selected). Additionally or alternatively, a previous color may be selected from options displayed by user interface 202. For instance, one of control buttons 208 may include a drop-down list (not shown) that displays names of colors to select as a previous color, toolbar 210 may display a palette of colors to select from as a previous color (not shown), and the like.

In one example, Previous color ring 218 enables a before and after comparison. For instance, suppose cloud 220 is selected by a user to set a previous color of previous color ring 218. Based on the user selection of cloud 220, previous color ring 218 indicates a color of cloud 220. As the user adjusts the color of color picker 206 (e.g., by moving color picker 206 relative to a color map), a new color is shown in cloud 220, while the previous color of the cloud before adjustment is still shown in previous color ring 218, enabling comparison of colors for cloud 220.

Additionally or alternatively, a previous color of color ring 218 can be determined from a color previously indicated by indicator 212 as a current color. For instance, color picker 206 may expose first content (e.g., a first portion of a color map) and indicate a first color as a current color of indicator 212. User interface 202 may then receive a user gesture to adjust the content exposed by color picker 206, such as a drag gesture that causes color picker 206 to update by exposing second content (e.g., a second portion of a color map), changing a current color indicated by indicator 212 based on the second content, and changing a previous color designated by color ring 218 to the first color. Separator ring 214 of indicator 212 is used to visually separate content of indicator 212 (e.g., a previous color and a current color) from content exposed by color picker 206, such as a portion of a color map. In the example in FIG. 2, separator ring includes a single white ring. However, this is only one example and separator ring may include any suitable container to visually separate the content of indicator 212 from content of a color map exposed by color picker 206, such as multiple nested containers (e.g., black and white nested rings), a box, a region of no color, combinations thereof, and the like.

Control buttons 208 can include any suitable user-selectable commands or options. In the example in FIG. 2, control buttons 208 include a selection for "undo" (e.g., to revert a change of content exposed by color picker 206), a selection for "cancel" (e.g., to remove an option, such as to cause a drop-down list to be closed), a selection for "accept" (e.g., to accept a current color of indicator 212 and apply it to digital image 204), and a selection for "redo" (e.g., to revert to a condition prior to execution of an "undo" selection).

Additionally or alternatively, control buttons 208 can include selections for setting a previous color (e.g. a drop-down list of names of previous colors), options for selecting a color map (e.g., a drop-down list of names of color maps, such as "rainbow", "greyscale", "cool to warm", "rainbow plus fade", "rainbow+blue", and the like), a search option to initiate a search for a color map, image, and the like, options for selecting a shape or style of indicator 212 (e.g., selecting square versus round indicators, and numbers of separator containers included in separator ring 214), a selection to turn off a previous color of color ring 218 (e.g., color ring 218 may be removed, or populated with a current color of indicator 212, thus expanding a visual representation of a current color indicated by indicator 212 by enlarging the effective size of circle 216 when color ring 218 is populated with a same current color as circle 216), and the like.

Selections of control buttons 208 are not limited to those exposed at any one time in user interface 202. For instance, a user may access hidden selections of control buttons 208 with a swipe or pan gesture, that causes some selection to move from a viewable position of user interface 202 to a hidden position, and some hidden selections to become viewable in user interface 202. For instance, a swipe gesture of control buttons 208 to the left (not shown) may cause the "undo" selection to become hidden in user interface 202 (e.g., so it is no longer exposed) and a new selection to be exposed to the right of the "redo" selection.

Toolbar 210 can include any suitable representations of any suitable data for user interface 202. In the example illustrated in FIG. 2, toolbar 210 contains thumbnail image representations of color maps, including a thumbnail representation of a digital photograph. In one example, a user selects one of the representations of color maps in toolbar 210, such as with a double-tap gesture, and causes the color map corresponding to the selected thumbnail image to be a current color map having content exposed by color picker 206. Hence, a user may change between color maps used by color picker 206 by selecting thumbnail representations of color maps in toolbar 210.

In one example, a position of a color picker within a selected color map, which determines a content portion of the color map exposed by the color picker, is determined from a previous color designated by indicator 212. For instance, color picker 206 may expose content from a first color map and indicator 212 designate a first previous color of the first color map, such as with color ring 218. A user may select a second color map, such as with one of the thumbnail representations of toolbar 210. The content of second color map exposed by color picker 206 may be determined by the first previous color indicated for the first color map. For instance, color picker system 116 may position color picker 206 to overlap a portion of the second color map that includes a color that is determined to be the same or similar as the first previous color.

Accordingly, different color maps can be selected by a user, loaded into color picker system 116 and exposed by color picker 206 in a way that the different maps initially expose similar content, making it easier for a user to select an appropriate color when considering different color maps. In contrast, if initial content of different color maps exposed by color picker 206 were not selected to be similar, such as randomly selected, a user may need to adjust the content of each color map exposed by color picker 206 when the color map is initially selected, which is inefficient for the user, in terms of time and effort (e.g., number of commands in a workflow of color selection).

Figure 3:
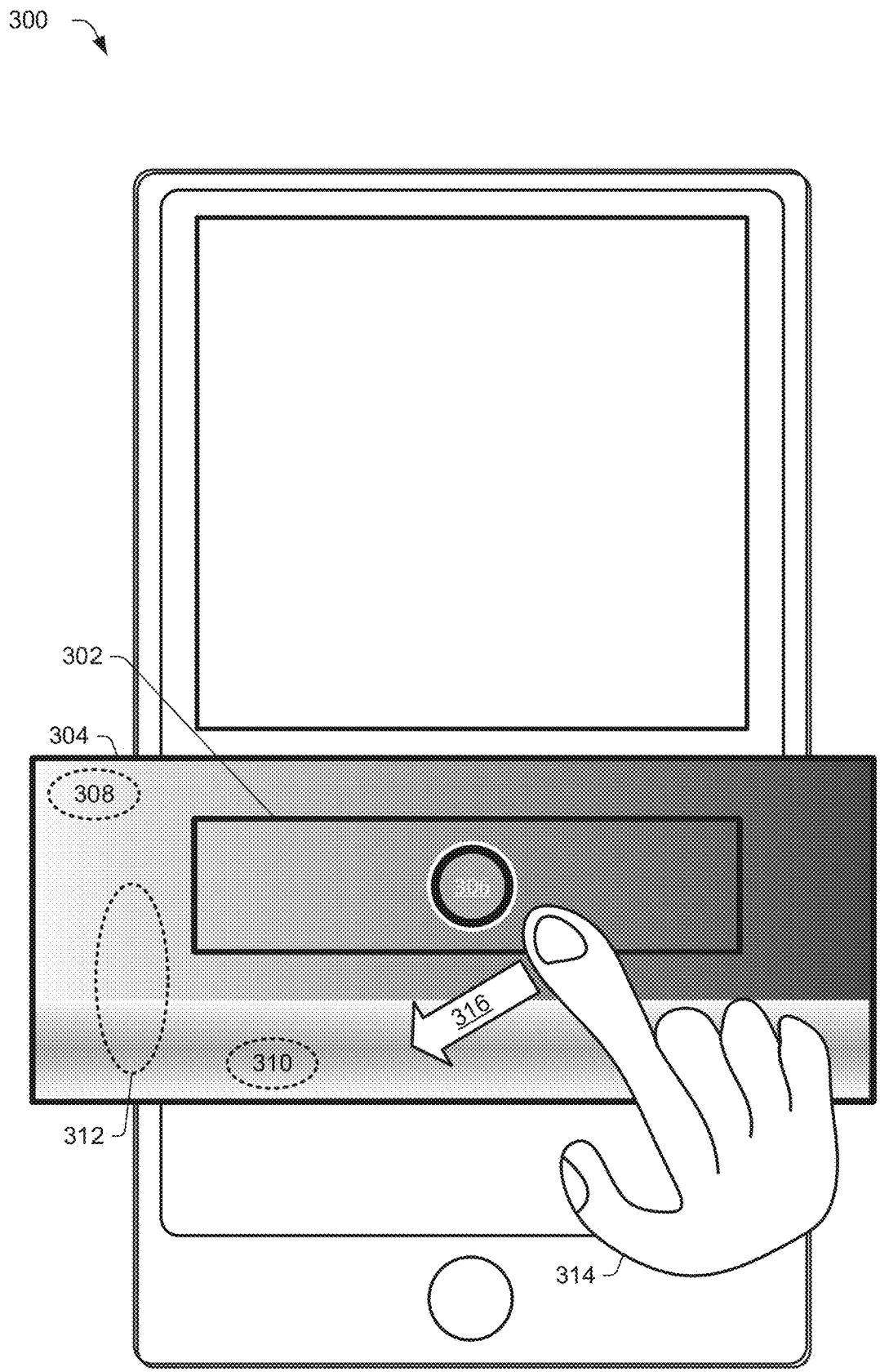
FIG. 3 illustrates an example mobile device with an example color picker and example color map in accordance with one or more aspects of the disclosure.

To illustrate how a user can change the content of a color map exposed by a color picker, such as color picker 206 in user interface 202, consider FIG. 3.

FIG. 3 illustrates an example mobile device 300 with an example color picker 302 and example color map 304 in accordance with one or more aspects of the disclosure. Mobile device 300 is an example of mobile device 200 in FIG. 2, and color picker 302 is an example of color picker 206 in FIG. 2. Moreover, color picker 302 includes indicator 306, which is an example of indicator 212 in FIG. 2.

In the example in FIG. 3, color map 304 represents a 2D color map, and illustrates changes in color in two dimensions. Color map 304 includes an upper region 308 and a lower region 310, each containing different gradients of color. Moreover, color map 304 is illustrated in FIG. 3 with elliptical region 312 that includes both a portion of upper region 308 and a portion of lower region 310. Elliptical region 312 is used for illustrative purposes, such as for spatial reference of color picker 302 within color map 304 (see also FIG. 4).

In FIG. 3, color picker 302 overlaps a portion of color map 304, and a user interface of mobile device 300 exposes only the overlapped portion of color map 304 in color picker 302. For instance, elliptical region 312 is not overlapped by color picker 302, and consequently elliptical region 312 is not exposed in a user interface depicting color picker 302. Rather, color picker 302 exposes a rectangular portion of color map 304 that is overlapped by color picker 302.

Conceptually, color picker 302 is a window into color map 304 whose position within color map 304 determines the content of color map 304 that is exposed by color picker 302. The content of color map 304 exposed by color picker 302 can be changed by moving color picker 302 within color map 304, including translating a position of color picker 302 within color map 304, adjusting a zoom level of color picker 302 relative to color map 304 (e.g., changing a coverage area of color map 304 exposed by color picker 302), and combinations thereof.

By exposing only a portion of color map 304 in color picker 302, but allowing access to any portion of color map 304 with user gestures, such as pan, scroll, and zoom gestures, a user can quickly determine an acceptable color in a color map that includes a very large number of colors and variations of colors, far more than could be displayed at any one time on device 300.

To access a different portion of color map 304 than what is exposed by color picker 302 in FIG. 3, a user 314 performs a drag gesture on a touchscreen of mobile device 300. The drag gesture is denoted by arrow 316 in FIG. 3. For instance, arrow 316 indicates that user 314 drags a finger in the direction of arrow 316. Responsive to receiving the user gesture indicated by arrow 316, the position of color picker 302 is moved within color map 304 so that color picker 302 overlaps a different portion of color map 304, and therefore content exposed by color picker 302 is updated, such as by changing a portion of color map 304 that is exposed by color picker 302. These changes responsive to receiving the drag gesture indicated by arrow 316 are illustrated in FIG. 4.

Figure 4:
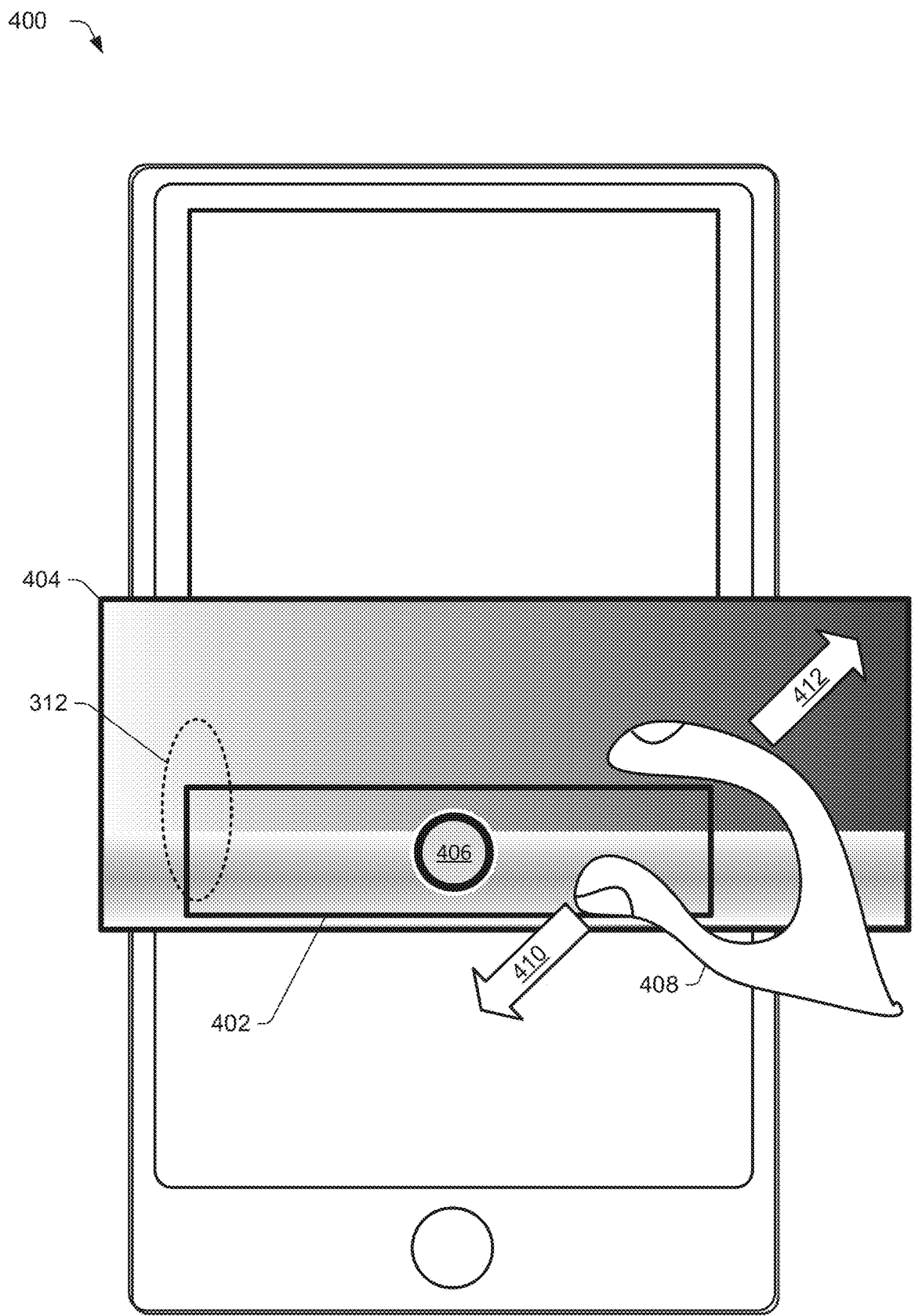
FIG. 4 illustrates an example mobile device with an example color picker and example color map in accordance with one or more aspects of the disclosure.

FIG. 4 illustrates an example mobile device 400 with an example color picker 402 and example color map 404 in accordance with one or more aspects of the disclosure. Mobile device 400 is an example of mobile device 300 in FIG. 3. Color picker 402 is an example of color picker 302 in FIG. 3, and color map 404 is an example of color map 304 in FIG. 3. Moreover, color picker 402 includes indicator 406, which is an example of indicator 306 in FIG. 3.

The example illustrated in FIG. 4 denotes color picker 402 and color map 404 based upon the drag gesture indicated by arrow 316 as illustrated in FIG. 3. Comparing FIG. 3 and FIG. 4, the position of color picker 402 within color map 404 in FIG. 4 is different than the position of color picker 302 within color map 304 in FIG. 3. Color picker 402 has been repositioned within color map 404 and includes a portion of elliptical region 312. Hence, in FIG. 4, the content of color map 404 exposed by color picker 402 has been changed to include the portion of color map 404 overlapped by color picker 402, including a portion of elliptical region 312.

Moreover, because the position of color picker 402 within color map 404 has been changed in FIG. 4 compared to FIG. 3, causing color picker 402 to expose a different region of color map 404 than exposed by color picker 302 in FIG. 3, a current color of indicator 406 has been updated in FIG. 4 based on a position of indicator 406 within color map 404. For instance, a current color indicated by indicator 406 in FIG. 4 is different than a current color indicated by indicator 306 in FIG. 3.

To expose a different amount of area of color map 404 in color picker 402, a user may perform a zoom gesture. For instance, a gesture indicating a zoom-in request may expose more detail of less of the content of color map 404 in color picker 402 (e.g., a smaller coverage area of color map 404 is exposed in color picker 402). A gesture indicating a zoom-out request may expose less detail of more of the content of color map 404 in color picker 402 (e.g., a larger coverage area of color map 404 is exposed in color picker 402).

To illustrate a zoom-in request, a user 408 performs a pinch gesture (e.g., a pinch-out gesture) on a touchscreen of mobile device 400. The pinch gesture is denoted by arrow 410 and arrow 412 in FIG. 4. For instance, arrow 410 and arrow 412 indicate that user 408 moves two fingers away from each other. Responsive to receiving the pinch gesture indicated by arrow 410 and arrow 412, color picker 402 is updated so that it exposes zoomed-in content of color map 404, as illustrated in FIG. 5.

Figure 5:
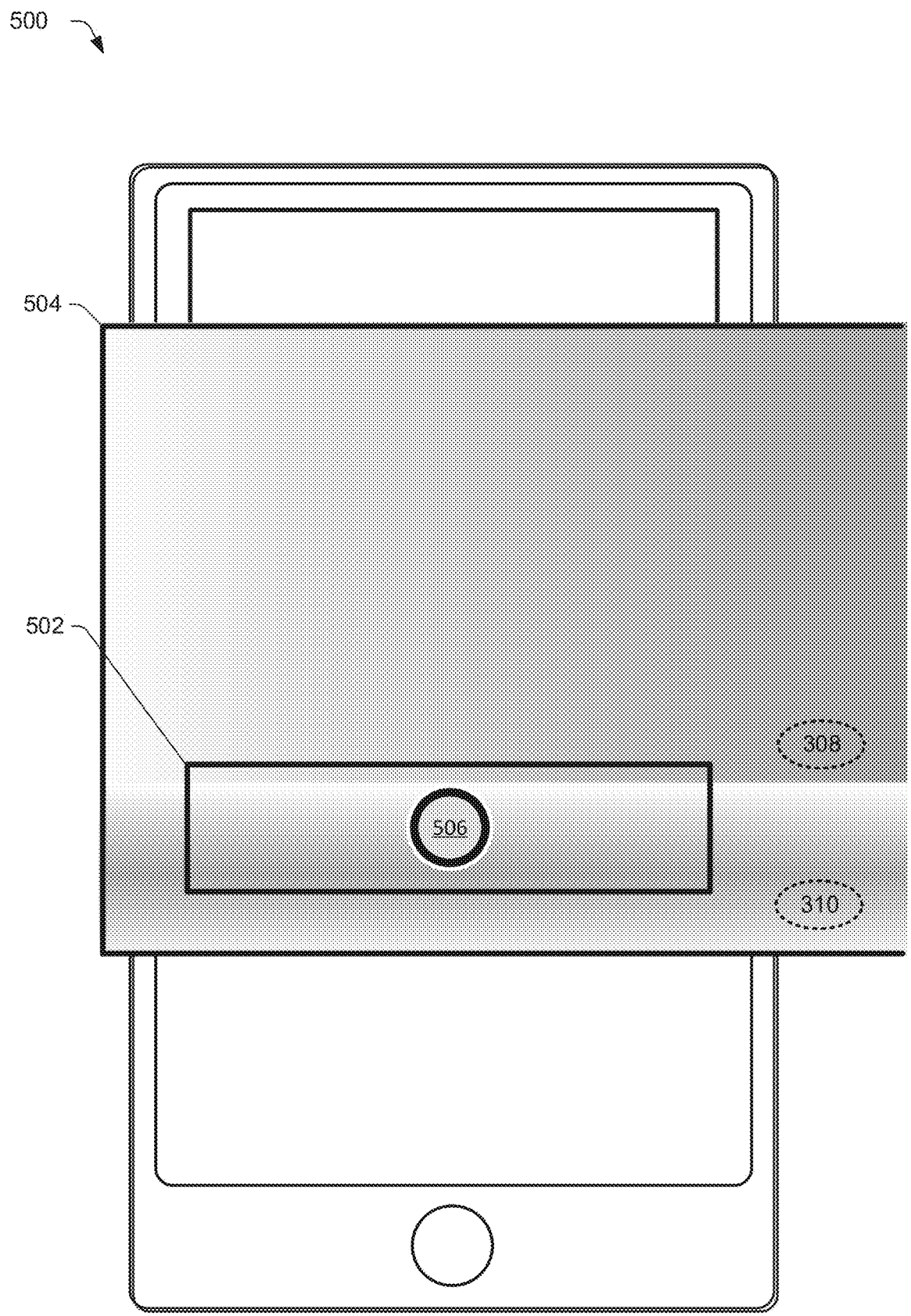
FIG. 5 illustrates an example mobile device with an example color picker and example color map in accordance with one or more aspects of the disclosure.

FIG. 5 illustrates an example mobile device 500 with an example color picker 502 and example color map 504 in accordance with one or more aspects of the disclosure. Mobile device 500 is an example of mobile device 400 in FIG. 4. Color picker 502 is an example of color picker 402 in FIG. 4, and color map 504 is an example of color map 404 in FIG. 4. Moreover, color picker 502 includes indicator 506, which is an example of indicator 406 in FIG. 4.

The example illustrated in FIG. 5 denotes color picker 502 and color map 504 based upon the pinch gesture indicated by arrow 410 and arrow 412 in FIG. 4. Comparing FIG. 5 and FIG. 4, the content of color map 504 exposed in color picker 502 in FIG. 4 is zoomed in relative to the content of color map 404 exposed in color picker 402 in FIG. 4. The content of color map 504 exposed by color picker 502 has been changed to include the portion of color map 504 overlapped by color picker 502, which is a zoomed in portion of content in FIG. 5 compared to FIG. 4.

Since a user can perform multiple zoom gestures to zoom-in and zoom-out of content of a color map, and translate the position of the color picker within the color map with pan and scroll gestures, without obstructing an indicator of a current color of a color map, a user can efficiently navigate a color map containing a very large number of colors at a desired level of detail of exposed colors to select a desired color. Furthermore, the user does not need to touch a position of a current color on a color map to select a current color, but instead can select a current color of a color map by adjusting a position and zoom level of a color picker within a color map until a desired color is indicated at a fixed-position indicator of current color. Hence, user gestures to adjust a color picker within a color map do not obscure an indicator of the current color.

Figure 6:
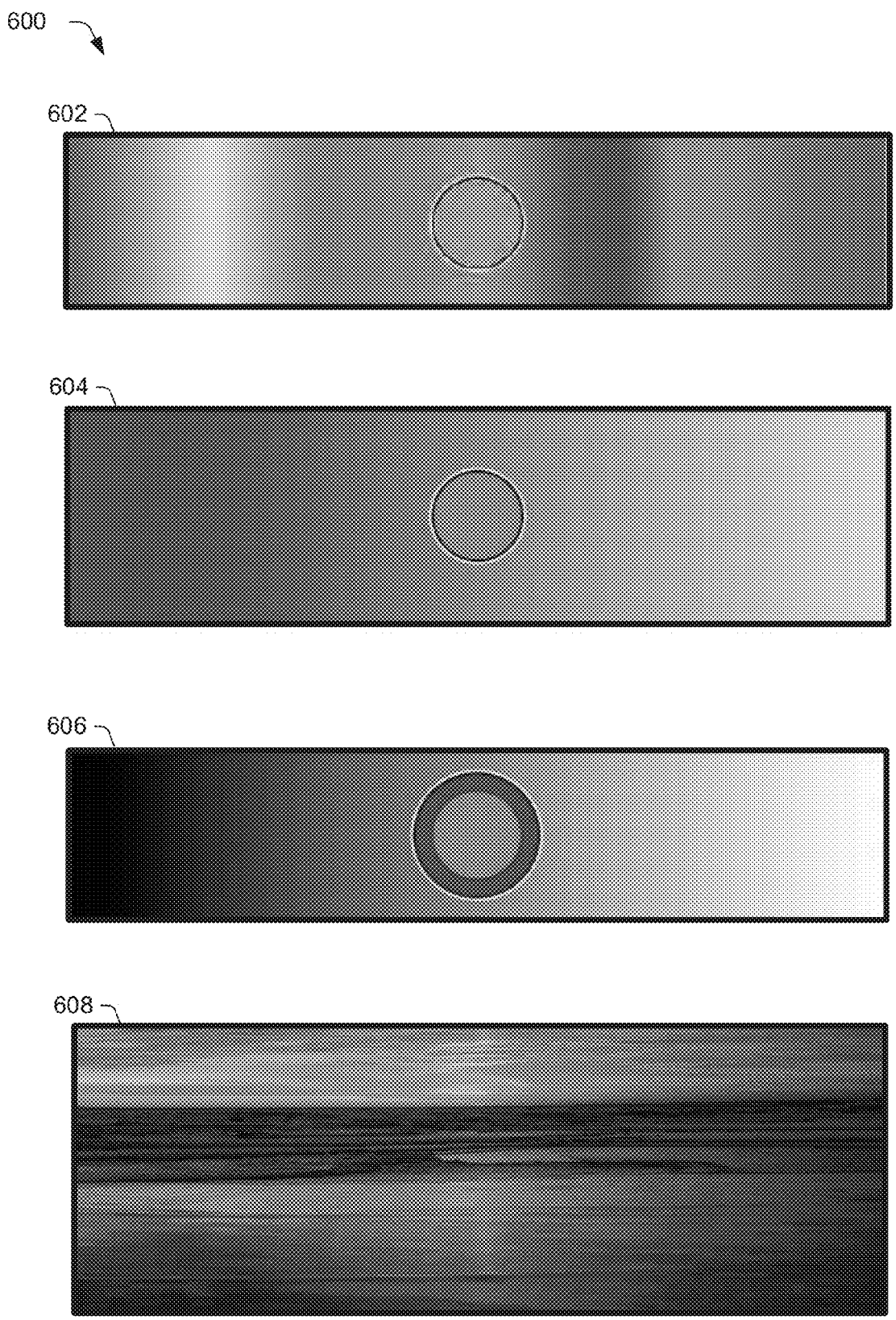
FIG. 6 illustrates example color maps in accordance with one or more aspects of the disclosure.

FIG. 6 illustrates example color maps 600 in accordance with one or more aspects of the disclosure. Color maps 600 include color map 602, color map 604, color map 606, and color map 608 which illustrate colors in a plane of colors. Color map 602, color map 604, and color map 606 represent 1D color maps in that color is changed in one dimension, and color map 608 represents a 2D color map in that color is changed in two dimensions.

Color map 602 illustrates a rainbow of colors, such as might be indicated by a naturally occurring rainbow, transitioning continuously between colors. Color map 604 illustrates a transition of colors according to color temperature, from cool to warm. Color map 606 illustrates a greyscale ramp. Each of color map 602, color map 604, and color map 606 displays an indicator of a current color of the color map, such as indicator 212 in FIG. 2.

Color map 608 includes a digital photograph of a sunset over water, and spans a complex array of colors suitable for color selection. For instance, a digital image for color adjustment, such as digital image 204 in FIG. 2, may be used to determine an appropriate digital photograph to use as a color map, such as based on finding similar images, or images with similar content, as the digital image being color adjusted. In one example, color map 608 is selected by color picker system 116 as a color map to select a color for color adjustment based on color map 608 including similar features as a digital image having its color adjusted. For instance, color picker system 116 may select color map 608 based on features such as "sunset", "sunrise", "beach", and the like extracted from a digital image having its color adjusted that match features of content included in color map 608.

Figure 7:
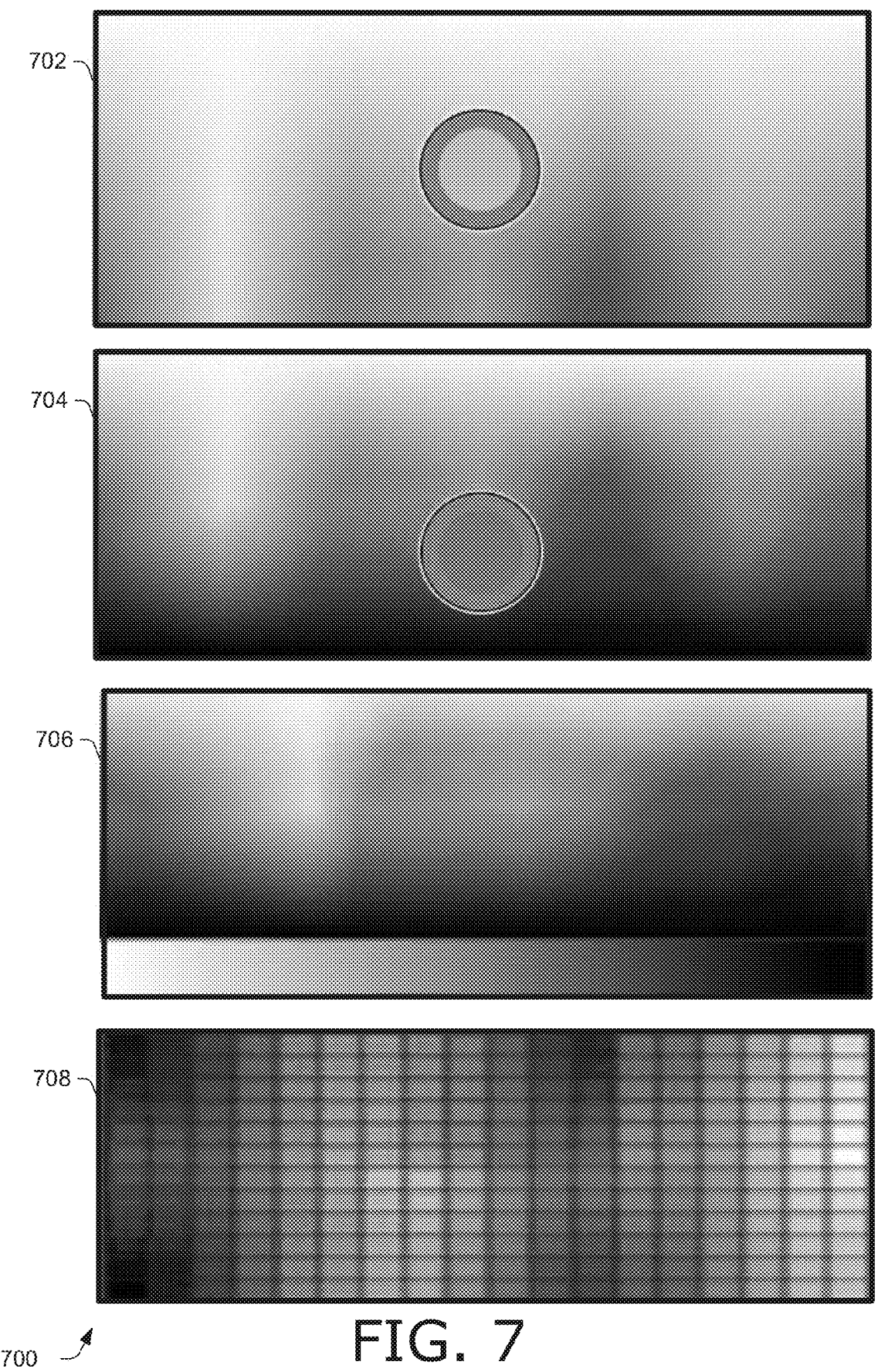
FIG. 7 illustrates example color maps in accordance with one or more aspects of the disclosure.

FIG. 7 illustrates example color maps 700 in accordance with one or more aspects of the disclosure. Color maps 700 include color map 702, color map 704, color map 706, and color map 708 which illustrate colors in a plane of colors. Color map 702, color map 704, color map 706, and color map 708 represent a 2D color map in that color is changed in two dimensions.

Color map 702 illustrates a rainbow of colors in one dimension and a fade to white (e.g., blend from zero to one hundred percent white) in the orthogonal dimension. Color map 704 illustrates a rainbow of colors in one dimension and a fade to black (e.g., blend from zero to one hundred percent black) in the orthogonal dimension. Color map 706 illustrates a rainbow of colors in one dimension and a fade to black in the orthogonal dimension together with a greyscale ramp. Color map 708 illustrates a discretized color map including patches of constant color in a 2D array of patches.

Figure 8:
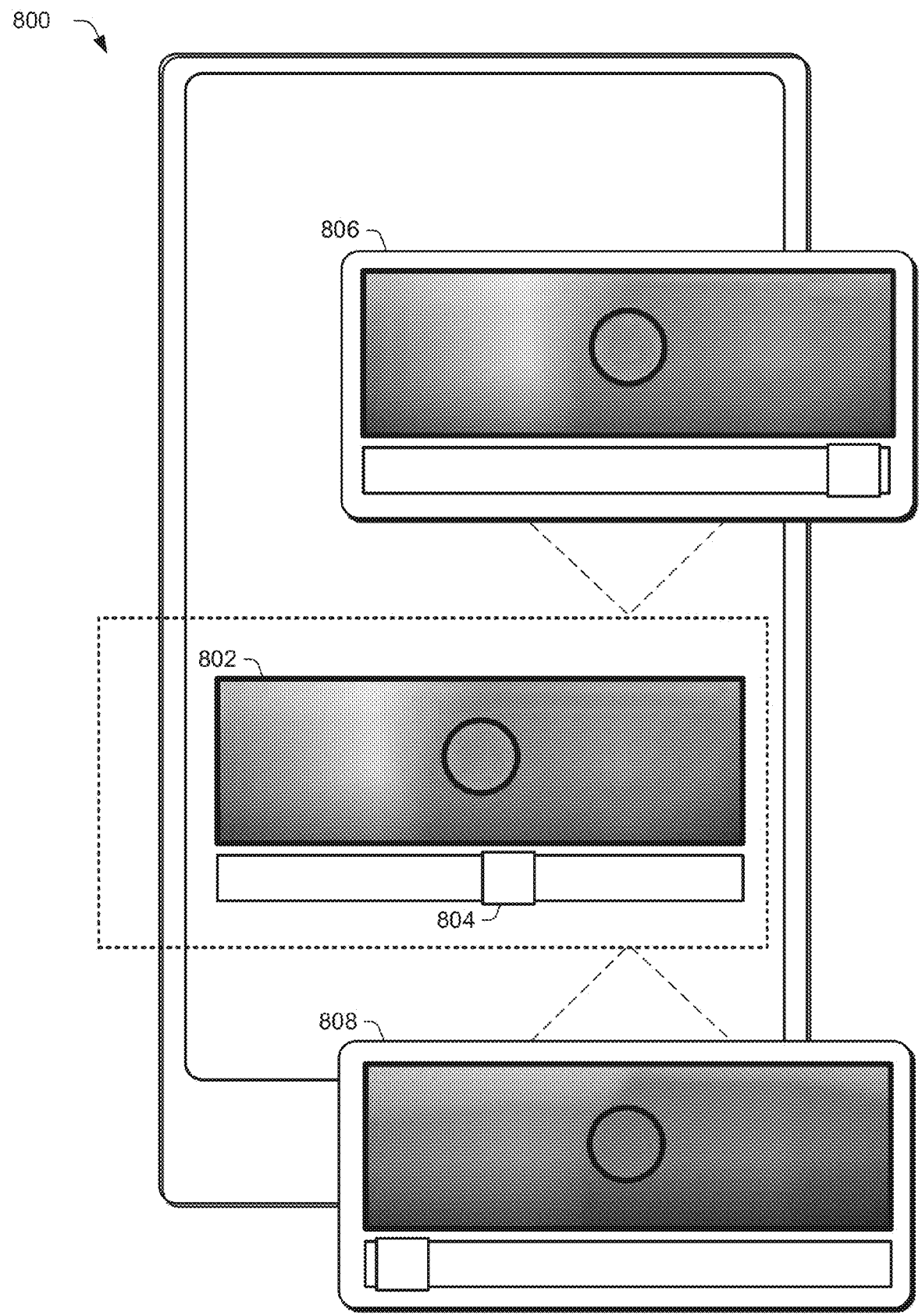
FIG. 8 illustrates an example mobile device with an example color picker for a 3D color map in accordance with one or more aspects of the disclosure.

FIG. 8 illustrates an example mobile device 800 with an example color picker for a 3D color map in accordance with one or more aspects of the disclosure. Mobile device 800 is an example of one of computing devices 104 in FIG. 1. Mobile device 800 exposes via a user interface color picker 802 and adjuster 804. Color picker 802 exposes content of a color map that represents a 3D color space, such as a color space according to triplets of dimensions such as (hue, saturation, lightness), (hue, saturation, value), (hue, saturation, brightness), (red, green, blue), combinations thereof, and the like. Color picker 802 exposes a plane of colors, such as a plane including content over two of the three dimensions of the 3D color space.

Adjuster 804 adjusts a value of a third dimension of the color space used to determine the content exposed in the plane of colors by color picker 802. For instance, for a color space represented in dimensions (hue, saturation, value), color picker 802 may expose in a color plane a color map across hue and value dimensions, and change a variable in a saturation dimension using adjuster 804.

Adjuster 804 can be any suitable adjuster. In the example in FIG. 4 adjuster 804 includes a slider adjustment. In one example, adjuster 804 is not expressly displayed by mobile device 800, but instead a user gesture is used to adjust an amount of a parameter of a third dimension that is used to determine the content exposed by color picker 802. For instance, a three-finger swipe gesture, such as panning simultaneously with three fingers, may be used to adjust a an amount of a parameter of a third dimension that is used to determine the content exposed by color picker 802, instead of or in addition to displaying adjuster 804.

For comparison, inset 806 of FIG. 8 displays color picker 802 when adjuster 804 is at a "high saturation" position for a saturation dimension in a color space represented by (hue, saturation, value) dimensions. The plane of color exposed by color picker 802 in the example in FIG. 8 is across hue and value dimensions. Inset 808 of FIG. 8 displays color picker 802 when adjuster 804 is at a "low saturation" position for a saturation dimension in the color space represented by (hue, saturation, value) dimensions. Hence, a user can easily traverse a 3D color map and expose any desired portion of the 3D color map at any desired level of detail with color picker 802, using pan, scroll, and zoom gestures, as previously described.

Having considered example user interfaces, color pickers, and color maps, consider now a discussion of an example system usable for color selection with a color picker in accordance with one or more aspects of the disclosure.

Example Color Picker System

Figure 9:
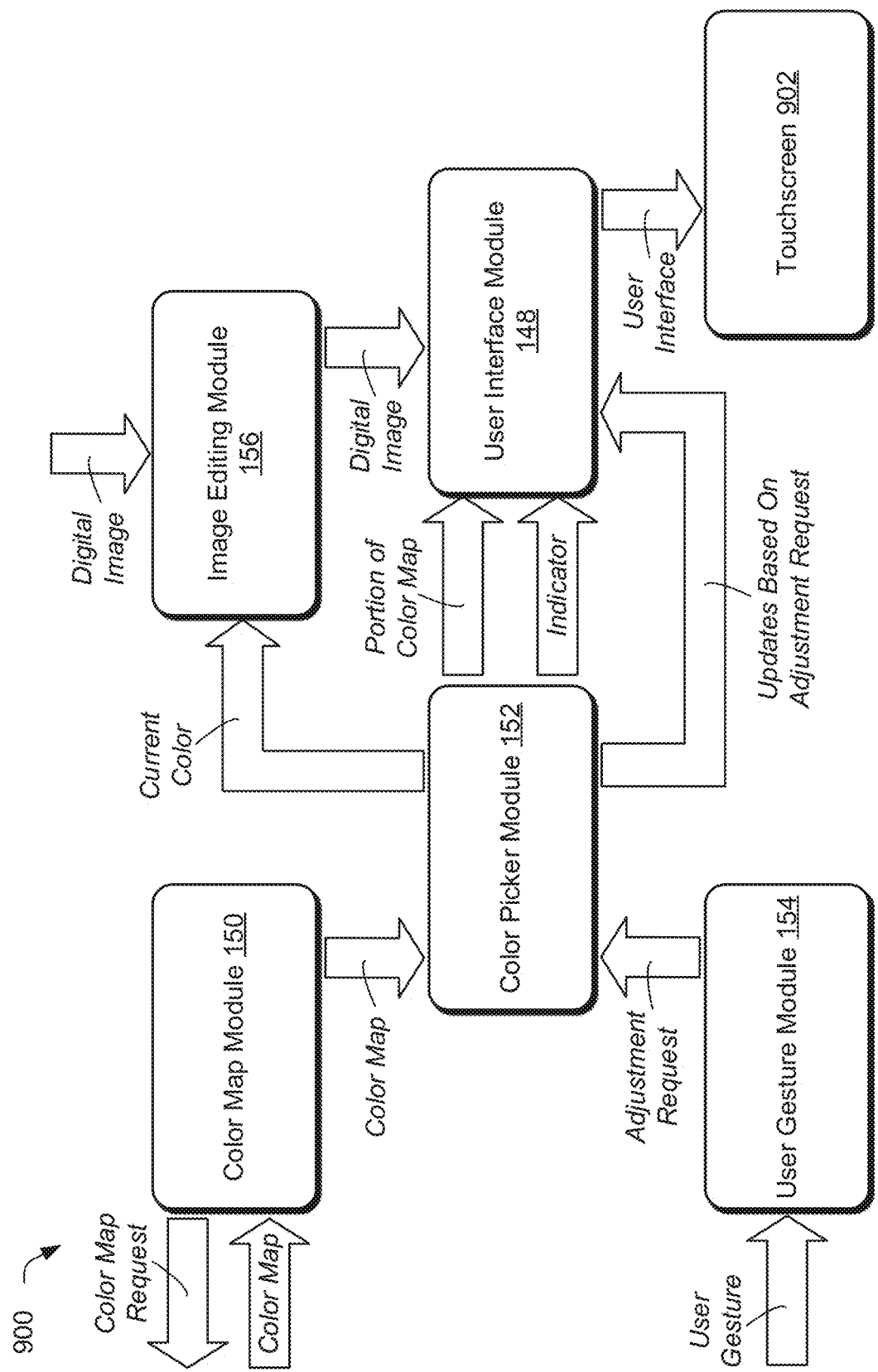
FIG. 9 illustrates an example system in accordance with one or more aspects of the disclosure.

FIG. 9 illustrates an example system 900 in accordance with one or more aspects of the disclosure. In this implementation, system 900 includes the modules of color picker application 126 as described in FIG. 1, e.g., user interface module 148, color map module 150, color picker module 152, user gesture module 154, and image editing module 156. System 900 is one example of color picker system 116 that can be constructed using the modules of color picker application 126. For instance, signals can be redefined, and modules can be modified, combined, divided, added, or removed to form a modified system, without altering the functionality of system 900. Accordingly, such modified systems are considered to be within the scope of the disclosure.

Furthermore, for simplicity system 900 is limited to the modules of color picker application 126 and a description of some of their interconnects. System 900 can, however, include any suitable signals and communications between modules omitted for simplicity. Such signals may include system clocks, counters, image indicators, image frame indicators, feature indicators, color map identification numbers, reset signals, and the like. In one example, system 900 can operate in real time (e.g., with no perceptible delay to a user) to apply a color to a digital image. Accordingly, signals can be calculated by the modules of system 900 and communicated between the modules of system 900 without significant delay. In one example, system 900 can preemptively obtain color maps based on a digital image, so that once a digital image for color adjustment is obtained by system 900, color maps and suggested colors are presented to a user without delay of a user search for and selection of a color map.

Moreover, system 900 can be implemented on any suitable device or devices. In one example, system 900 is implemented on one computing device (e.g., one of computing devices 104 in FIG. 1). In another example, system 900 is implemented on more than one computing device. For instance, parts of system 900 can be implemented by a first computing device, such as computing device 104-1 in FIG. 1, and other parts of system 900 can be implemented by an additional computing device or devices, such as computing device 104-2. In one example, a server implements parts of system 900, such as server 122 in FIG. 1. A server can be remote, e.g., because it is not collocated with the first computing device. A server may be configured to receive signals of system 900 from a computing device (e.g., one or more of computing devices 104), process the received signals, such as with color picker support system 124, and transmit results of the processing back to the computing device. Hence, color picker support system 124 of server 122 in FIG. 1 may include system 900.

Additionally or alternatively, parts of system 900 can be implemented by an additional computing device that is collocated with a first computing device. For instance, one of computing devices 104 may be a first computing device, and another of computing devices 104 may be an additional, collocated computing device. The first computing device and the additional computing device may be operated by one or more users. Hence, system 900 provides for multiple users within an environment to share data included in system 900. For instance, a digital image may be obtained by a first computing device operated by a first user who selects a region of the digital image for color adjustment, such as a background of the image. The digital image and an indication of the region selected by the first user can be sent to another computing device operated by a second user. The second user can then color adjust the digital image by applying a color to the selected region of the digital image, and send the color-adjusted digital image back to the first user and the first computing device for consumption (e.g., display on a touchscreen, play in a video sequence, and the like).

Image editing module 156 obtains one or more digital images. For instance, a user may load a digital image into system 900 to adjust one or more colors of the digital image. Image editing module 156 provides a digital image to user interface module 148 for display in a user interface on touchscreen 902.

Color map module 150 obtains a color map. Color maps 600 and color maps 700 in FIG. 6 and FIG. 7, respectively, are examples of color maps obtained by color map module 150. Color map module 150 may obtain a color map responsive to a request to obtain a color map. For instance, color map module 150 may send a request for a color map to a database of color maps maintained by a server, which, based on the request, returns a color map to color map module 150.

In one example, color map module 150 obtains a color map responsive to a digital image for color adjustment being exposed on touchscreen 902. Additionally or alternatively, color map module 150 may obtain a color map responsive to a user request. For instance, a user may select a color map option exposed by a user interface on touchscreen 902, such as by selecting a thumbnail image of a color map, a name of a color map in a list of color maps, and the like, and responsive to the user selection, color map module 150 may obtain a color map.

In one example, a color map obtained by color map module 150 includes a representation of the color map, such as a thumbnail image of the color map, a text description, an animation or filmstrip (e.g., a sequence illustrating different regions of the color map), a cartoon, a drawing, and the like. A representation of a color map may be exposed in a user interface generated by user interface module 148 displayed on touchscreen 902 to enable user selection of a color map, such as by touching on a representation of a color map.

Color map module 150 provides a color map to color picker module 152. Color picker module 152 generates a color picker based on a color map received by color map module 150. For instance, color picker module 152 determines a portion of a color map received by color map module 150 to expose in a color picker of color picker module 152. Color picker module 152 also determines an indicator of a current color of a color picker. Color picker

206 and indicator 212 in FIG. 2 are examples of a color picker and indicator, respectively, generated by color picker module 152.

A portion of a color map determined by color picker module 152 can be determined in any suitable way. In one example, a portion of a color map to expose in a color picker of color picker module 152 is determined based on a user gesture, such as a pan or zoom gesture to position a color picker within a color map. Additionally or alternatively, portion of a color map to expose in a color picker of color picker module 152 can be determined from a previous color. For instance, color picker module 152 may obtain an indication of a previous color from a user selection (e.g., a user selects a color to designate as a previous color), a color that was previously indicated as a current color by color picker module 152 (e.g., prior to receiving a user gesture to reposition the color picker within the color map), a default color, and the like. Color picker module 152 may position a color picker within a color map so that an indicator of a current color of the color picker overlaps the previous color of the color map.

Color picker module 152 provides a color picker, including a portion of a color map to expose in the color picker and an indicator of a current color, to user interface module 148.

User interface module 148 receives a color picker (e.g., a portion of a color map to expose in the color picker and an indicator of a current color) from color picker module 152 and a digital image from image editing module 156, and generates a user interface to expose on touchscreen 902. User interface 202 in FIG. 2 is an example of a user interface generated by user interface module 148. Hence, a user interface generated by user interface module 148 displays a color picker in the context of a digital image that is to be color adjusted by the color picker (e.g., the color picker and digital image are exposed proximate to each other, with at least part of the digital image viewable while the color picker is exposed).

User gesture module 154 receives a user gesture. For instance, a user gesture may be received by user gesture module 154 via touch inputs on touchscreen 902 indicative of a user request, such as a user selection on a user interface of user interface module 148 exposed on touchscreen 902. A user gesture received by user gesture module 154 may include any suitable user gesture, such as a gesture indicating a zoom request (e.g., zoom in or zoom out to adjust a magnification level), a scroll request (e.g., to pan through information presented in a user interface), and the like.

A user gesture received by user gesture module 154 indicates an adjustment request, such as for changing a current color indicated by a color picker, changing a portion of a color map depicted by a color picker exposed in a user interface on touchscreen 902, and the like. In one example, a user gesture received by user gesture module 154 is indicative of a request for adjusting a color picker of color picker module 152 within a color map obtained by color map module 150. Hence, user gesture module 154 determines parameters for an adjustment request corresponding to a user gesture received by user gesture module 154 (e.g., a magnification level, trajectory, translation distance, position, and the like based on the user gesture) and provides parameters of the adjustment request to color picker module 152 so that color picker module 152 can adjust a color picker to fulfill the adjustment request indicated by the user gesture.

Color picker module 152 receives an adjustment request corresponding to a user gesture from user gesture module 154. For instance, an adjustment request may indicate an amount to move a color picker within a color map, a zoom level of a color picker relative to a color map, and the like. Based on the adjustment request, color picker module 152 generates updates to a color picker of color picker module 152. For instance, color picker module 152 may update a portion of a color map exposed by a color picker, an indicator of a current color, a designator of a previous color, and combinations thereof to fulfill an adjustment request indicated by a user gesture.

Color picker module 152 can generate updates to a color picker of color picker module 152 in any suitable way. In one example, updates are generated as differences between a previous color picker and an updated color picker. For instance, updates may include differences of pixel values exposed by a color picker from a previous version of the color picker to an updated version of the color picker, from which updated pixel values can be determined for exposure in the updated version of the color picker. Additionally or alternatively, updates to a color picker of color picker module 152 can include an updated portion of a color map and an updated indicator of a current color that can be exposed in a user interface of user interface module 148.

Color picker module 152 provides updates to a color picker (e.g., an updated portion of a color map to be exposed by the color picker and an updated indicator of current color) to user interface module 148. Color picker module 152 also provides a current color (e.g., a current color that has been updated based on positioning a color picker with a color map according to a user gesture received by user gesture module 154) to image editing module 156.

Image editing module 156 applies a current color received from color picker module 152 to a digital image. In one example, image editing module 156 applies a current color to a digital image responsive to a user selection in a user interface of user interface module 148, such as a touch gesture that enables an "apply current color" button. Additionally or alternatively, image editing module can apply a current color automatically, responsive to receiving a current color from color picker module 152.

Furthermore, image editing module 156 can apply a current color to any suitable portion of a digital image, such as a feature of an image that is user designated, e.g., from a user selection of an object in a digital image, a feature determined automatically and without user intervention by image editing module 156 (e.g., image editing module 156 may determine a feature to apply a current color to based on the current color, such as by selecting a feature of the digital image having a color that best matches the current color received by color picker module 152), all of a digital image, and the like.

Image editing module 156 provides a digital image (e.g., a digital image with its color adjusted with a current color from color picker module 152) to user interface module 148. User interface module 148 can generate a user interface (e.g., an updated user interface) with updates to a color picker received from color picker module 152 and a color-adjusted digital image received from image editing module 156. FIG. 3, FIG. 4, and FIG. 5 illustrate examples of user interfaces displaying color pickers updated based on user gestures.

System 900 constitutes an improvement over systems that do not present color pickers in the context of color adjustment, and obscure selection of a current color. System 900 exposes a color picker in the context of color adjustment by exposing a color picker proximate a digital image for which a color is to be adjusted. Hence, at least part of the digital image is viewable while the color picker is exposed, making it easier for a user to select an appropriate color with system 900 than with full-screen color pickers. Furthermore, system 900 generates a color picker whose contents expose a portion of a color map, and the contents that are exposed are easily changed with user gestures, such as pan, scroll, and zoom gestures. Hence, a user is able to easily access any content of a color map having large color content, at any desired level of detail, to determine a current color of a color picker. Moreover, since an indicator of current color is at a fixed position of a color picker, and the current color of the indicator is updated in real time as the contents exposed by the color picker are changed (e.g., due to a user gesture), the current color of the color picker is determined without obstruction by a user, as opposed to a user touch directly on a color of a color picker to select a current color. Accordingly, system 900 efficiently determines a color of a color picker with less user effort and user frustration than other systems.

Having considered an example system 900, consider now a discussion of example procedures for selecting a color with a color picker in accordance with one or more aspects of the disclosure.

Example Procedures

Figure 10:
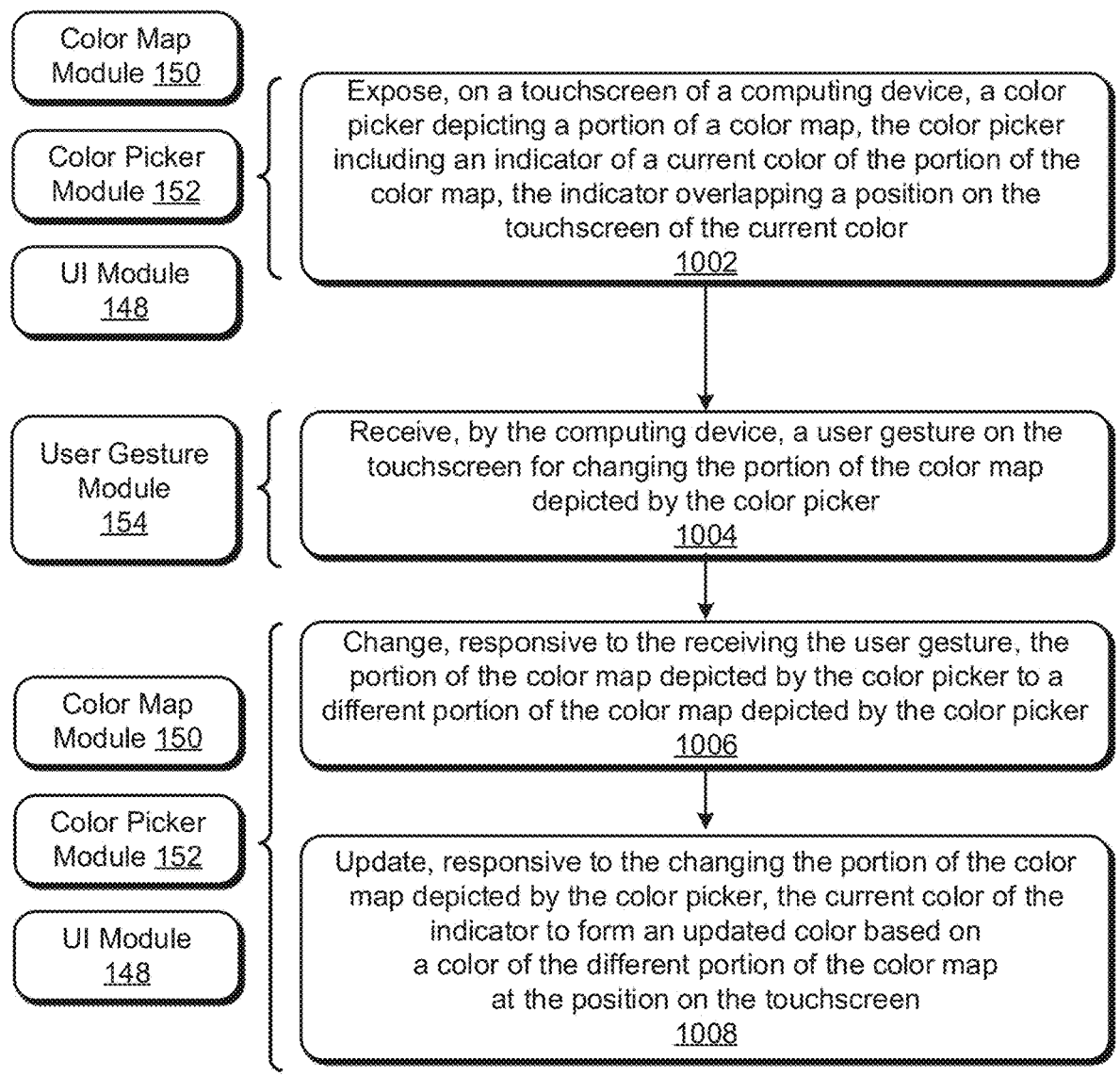
FIG. 10 illustrates a flow diagram depicting an example procedure in accordance with one or more aspects of the disclosure.

FIG. 10 illustrates an example procedure 1000 for selecting a color with a color picker in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 122 of FIG. 1 that makes use of a color picker system, such as system 900 or color picker system 116. A color picker system implementing procedure 1000 may be an independent application that has been installed on the computing device, a service hosted by a service provider that is accessible by the computing device, a plug-in module to the computing device, or combinations thereof.

A color picker depicting a portion of a color map is exposed on a touchscreen of a computing device (block 1002). The color picker includes an indicator of a current color of the portion of the color map, the indicator overlapping a position on the touchscreen of the current color. In one example, color map module 150 obtains a color map, color picker module 152 generates a color picker depicting a portion of the color map, and user interface module 148 exposes a user interface including the color picker on the touchscreen. The color map can be user selectable from a plurality of color maps, such as from a plurality of representations of color maps exposed in a user interface. In one example, at least one of the plurality of color maps includes a digital photograph.

In one example, a previously-selected color is determined, and the current color is set to the previously-selected color, so that the portion of the color map is determined from the previously-selected color.

Additionally or alternatively, the indicator is at a fixed position of the color picker. For instance, the fixed position can include the center of the color picker. Additionally or alternatively, the fixed position is user selectable, such as from a user selecting a position from a menu of positions, or a user touching on a position of the color picker to designate the touched position as a position to place the indicator for the current color.

In one example, the color picker further includes a designator of a previous color, the designator of the previous color touching the indicator of the current color. In one example, the designator of the previous color and the indicator of the current color are separated from other colors indicated by the color picker by a separator container. For instance, a designator of a previous color may include a color ring enclosing a circle filled with a current color, and the color ring may be enclosed by one or more separator rings.

A user gesture for changing the portion of the color map depicted by the color picker is received on the touchscreen (block 1004). In one example, user gesture module 154 receives a user gesture for changing the portion of the color map depicted by the color picker. A user gesture can include at least one of a pan gesture, a scroll gesture, and a zoom gesture. In one example, the user gesture is received at a different position on the touchscreen than the position on the touchscreen of the current color.

Responsive to the receiving the user gesture, the portion of the color map depicted by the color picker is changed to a different portion of the color map depicted by the color picker (block 1006). In one example, responsive to the receiving the user gesture, color picker module 152 changes a portion of a color map of color map module 150 depicted by a color picker of color picker module 152 to a different portion of the color map depicted by the color picker.

In one example, the portion of the color map and the different portion of the color map share a common portion of the color map. The common portion depicted by the color picker is at different positions of the touchscreen for the portion of the color map and the different portion of the color map. For instance, a pan gesture may scroll a color picker within a color map and cause the common portion depicted by the color picker to be at different positions of the touchscreen when the portion of the color map is exposed compared to when the different portion of the color map is exposed.

Additionally or alternatively, the different portion of the color map depicted by the color map may depict an area of the portion of the color map at a different level of detail than the portion of the color map depicted by the color map. For instance, a user gesture may indicate a zoom-in gesture, causing the color picker when depicting the different portion of the color map to depict an area of the portion of the color map at a finer level of detail than when the color picker depicts the portion of the color map.

Responsive to the changing the portion of the color map depicted by the color picker, the current color of the indicator is updated to form an updated color based on a color of the different portion of the color map at the position on the touchscreen (block 1008). In one example, responsive to the changing the portion of the color map depicted by the color picker, color picker module 152 updates the current color of the indicator to form an updated color based on a color of the different portion of the color map at the position on the touchscreen. A user interface of user interface module 148 can expose a color picker depicting the different portion of the color map, the indicator indicating the updated color.

In one example, a digital image is displayed on a touchscreen, and the updated color is applied to at least part of the digital image. At least part of the digital image can be viewable while the color picker is exposed. Additionally or alternatively, the color picker can be moved, resized, reshaped, combinations thereof, and the like. For instance, a color picker may be dragged to overlap a digital image so that a current color indicated by an indicator of the color picker can be easily compared to the digital image.

Figure 11:
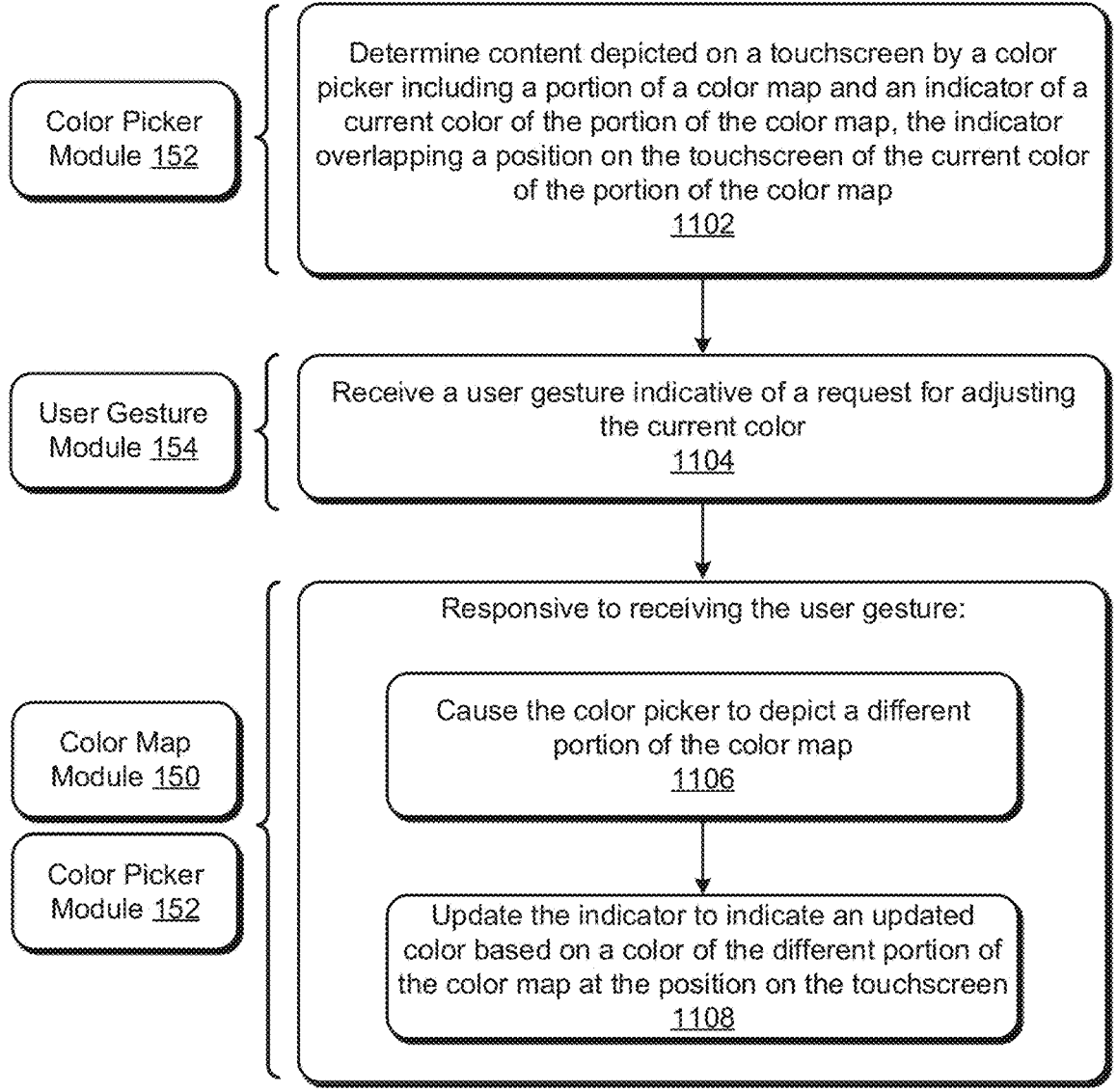
FIG. 11 illustrates a flow diagram depicting an example procedure in accordance with one or more aspects of the disclosure.

FIG. 11 illustrates an example procedure 1100 for selecting a color with a color picker in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 122 of FIG. 1 that makes use of a color picker system, such as system 900 or color picker system 116. A color picker system implementing procedure 1100 may be an independent application that has been installed on the computing device, a service hosted by a service provider that is accessible by the computing device, a plug-in module to the computing device, or combinations thereof.

Content depicted on a touchscreen by a color picker including a portion of a color map and an indicator of a current color of the portion of the color map is determined (block 1102). The indicator overlaps a position on the touchscreen of the current color of the portion of the color map. In one example, color picker module 152 determines content depicted by the color picker including a portion of the color map and an indicator overlapping a position on the touchscreen of a current color of the portion of the color map, the indicator indicating the current color. For instance, color picker module 152 may position a color picker over the portion of the color map so the portion of the color map is exposed by the color picker. The indicator may indicate a color of the color map at the center position of the indicator on the touchscreen. In one example, the indicator size is user selectable and can be expanded, such as to cover a part of the color map that includes colors other than the current color.

In one example, user interface module 148 generates a user interface including a digital image and a color picker for the digital image and causes the user interface to be displayed on a touchscreen, such as by providing the user interface and instructions for displaying the user interface to the touchscreen of a mobile device.

Additionally or alternatively, color map module 150 can obtain a color map, such as from a database of color maps maintained by a server (e.g., server 122 in FIG. 1). The color map can be obtained from the plurality of color maps based on a user selection, and the user selection can indicate whether the indicator includes a designator of a previous color.

In one example, the color map represents a three dimensional color space, and the color picker displays content of two dimensions of the color space, a third dimension of the color space accessible via a user control that adjusts the content of the two dimensions depicted by the color picker according to a value of the third dimension determined by the user control.

A user gesture indicative of a request for adjusting the current color is received (block 1104). In one example, user gesture module 154 receives a user gesture indicative of a request for adjusting the current color. A request for adjusting a current color can include a request for adjusting the color picker within the color map.

Responsive to receiving the user gesture, the color picker is caused to depict a different portion of the color map (block 1106). In one example, color picker module 152 adjusts the color picker within the color map obtained by color map module 150 to cause the color picker to depict a different portion of the color map.

Responsive to receiving the user gesture, the indicator is updated to indicate an updated color based on a color of the different portion of the color map at the position on the touchscreen (block 1108). In one example, color picker module 152 updates the indicator to indicate an updated color based on a color of the different portion of the color map at the position on the touchscreen.

In one example, the updated color is applied to at least part of a digital image exposed in a user interface. For instance, image editing module 156 can apply the updated color to at least part of the digital image automatically responsive to the indicator being updated to indicate the updated color. Additionally or alternatively, image editing module 156 can apply the updated color to at least part of the digital image responsive to a user selection to apply the updated color.

Figure 12:
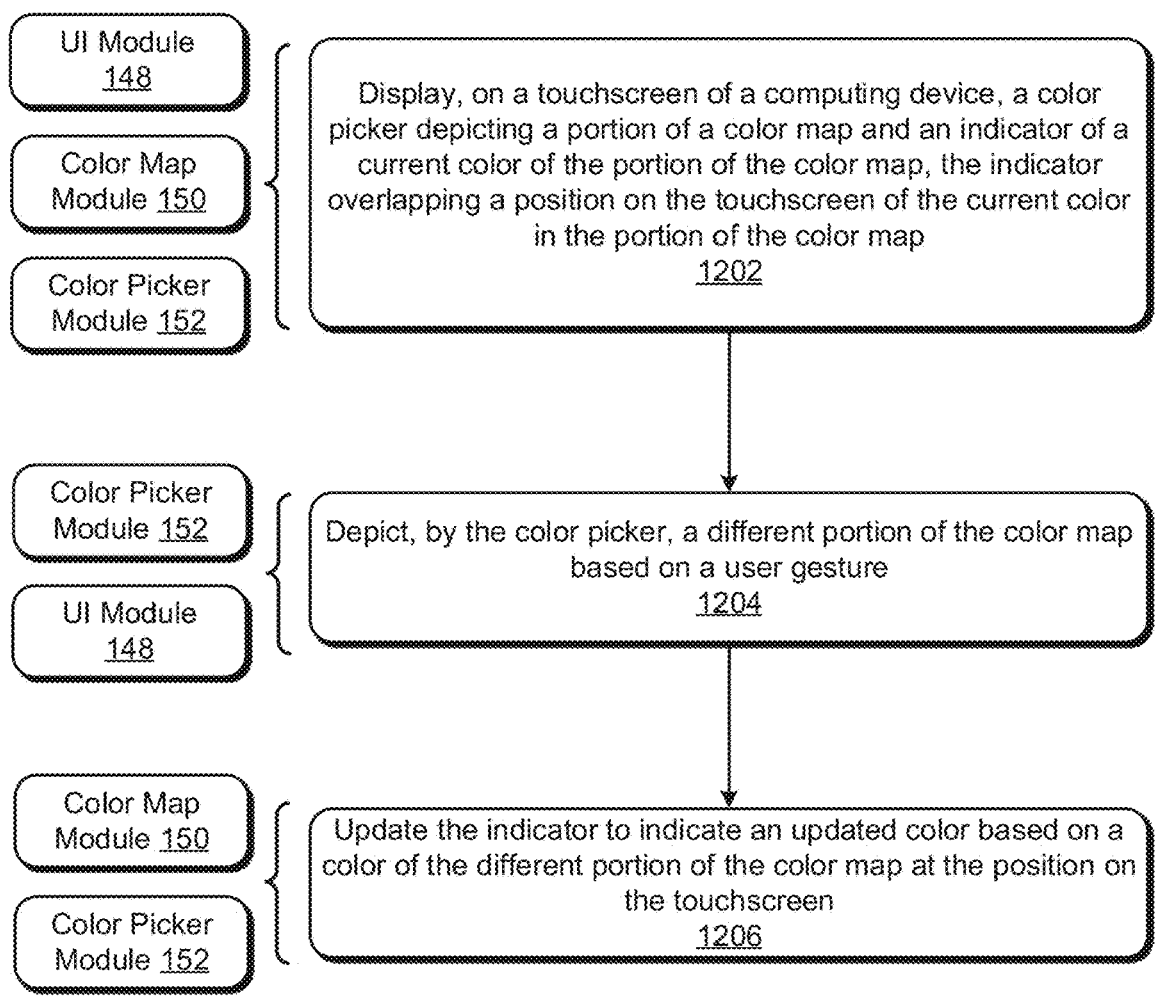
FIG. 12 illustrates a flow diagram depicting an example procedure in accordance with one or more aspects of the disclosure.

FIG. 12 illustrates an example procedure 1200 for selecting a color with a color picker in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 122 of FIG. 1 that makes use of a color picker system, such as system 900 or color picker system 116. A color picker system implementing procedure 1200 may be an independent application that has been installed on the computing device, a service hosted by a service provider that is accessible by the computing device, a plug-in module to the computing device, or combinations thereof.

A color picker depicting a portion of a color map and an indicator of a current color of the portion of the color map is displayed on a touchscreen of a computing device (block 1202). The indicator overlaps a position on the touchscreen of the current color in the portion of the color map. In one example, a user interface including a digital image and a color picker depicting a portion of a color map and an indicator of a current color of the portion of the color map is generated by user interface module 148. Color map module 150 obtains a color map. Color picker module 152 generates a color picker and determines a portion of the color map depicted by the color picker.

A different portion of the color map is depicted by the color picker based on a user gesture (block 1204). In one example, color map module 150 obtains a color map, and color picker module 152 generates a color picker that depicts a different portion of the color map based on the user gesture. For instance, user gesture module 154 can receive a request for adjusting a current color, and color picker module 152 can adjust a location of the color picker within the color map. Adjusting the location of the color picker within the color map can include sliding the color picker through the color map by an amount based on a magnitude of the user gesture, such as an amount proportional to a length of a swipe gesture.

Additionally or alternatively, adjusting the location of the color picker within the color map can include adjusting an amount of area of the color map covered by the color picker. For instance, a zoom-in or zoom-out gesture may result in adjusting the location of the color picker within the color map can including adjusting an amount of area of the color map covered by the color picker. In one example, the portion of the color map and the different portion of the color map correspond to different amounts of area of the color map.

The indicator is updated to indicate an updated color based on a color of the different portion of the color map at the position on the touchscreen (block 1206). In one example, color map module 150 obtains a color map, and color picker module 152 updates the indicator to indicate an updated color based on a color of the different portion of the color map at the position on the touchscreen. Additionally or alternatively, the updated color can be applied to at least part of a digital image, such as a digital image exposed in a user interface of interface module 148.

The procedures described herein constitute an improvement over procedures that do not present color pickers in the context of color adjustment, and obscure selection of a current color. The procedures described herein expose a color picker in the context of color adjustment by exposing a color picker proximate to a digital image for which a color is to be adjusted. Hence, at least part of the digital image is viewable while the color picker is exposed, making it easier for a user to select an appropriate color with the procedures described herein than with procedures exposing full-screen color pickers. Furthermore, the procedures described herein generate a color picker whose contents expose a portion of a color map, and the contents that are exposed are easily changed with user gestures, such as pan, scroll, and zoom gestures. Hence, a user is able to easily access any content of a color map having large color content, at any desired level of detail, to determine a current color of a color picker. Moreover, since an indicator of current color is at a fixed position of a color picker, and the current color of the indicator is updated in real time as the contents exposed by the color picker are changed (e.g., due to a user gesture), the current color of the color picker is determined without obstruction by a user, as opposed to a user touch directly on a color of a color picker to select a current color. Accordingly, the procedures described herein efficiently determine a color of a color picker with less user effort and user frustration than other procedures.

Having considered example procedures in accordance with one or more implementations, consider now example systems and devices that can be utilized to practice the inventive principles described herein.

Example Systems and Devices

FIG. 13 illustrates an example system generally at 1300 that includes an example computing device 1302 that is representative of one or more computing systems and devices that may implement the various techniques described herein. This is illustrated through inclusion of color picker system 116, system 900, color picker application 126, and color picker support system 124, which operate as described above. Computing device 1302 may be, for example, a user computing device (e.g., one of computing devices 104), or a server device of a service provider, (e.g., server 122). Furthermore, computing device 1302 may include an on-chip system, multiple computing devices, combinations thereof, or any other suitable computing device or computing system. Accordingly, FIG. 13 illustrates computing device 1302 as one or more of a tablet, a laptop computer, a smart phone, smart eye glasses, and a camera, though these examples are illustrative and in no way are meant to limit the type or number of devices included in computing device 1302.

The example computing device 1302 includes a processing system 1304, one or more computer-readable media 1306, and one or more I/O interfaces 1308 that are communicatively coupled to each other. Although not shown, computing device 1302 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1304 is representative of functionality to perform one or more operations using hardware. Accordingly, processing system 1304 is illustrated as including hardware elements 1310 that may be configured as processors, functional blocks, and so forth. This may include implementation in hardware as an application specific integrated circuit or other logic device formed using one or more semiconductors. Hardware elements 1310 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 130 in FIG. 1 are an example of processing system 1304.

Computer-readable storage media 1306 is illustrated as including memory/storage 1312. Storage 132 in FIG. 1 is an example of memory/storage included in memory/storage 1312. Memory/storage component 1312 may include volatile media (such as random access memory (RAM)), non-volatile media (such as read only memory (ROM), Flash memory, optical disks, magnetic disks, and so forth), or combinations thereof. Memory/storage component 1312 may include fixed media (e.g., RAM, ROM, a fixed hard drive, and so on) as well as removable media (e.g., Flash memory, a removable hard drive, an optical disc, and so forth). Computer-readable media 1306 may be configured in a variety of other ways as further described below.

Input/output interface(s) 1308 are representative of functionality to allow a user to enter commands and information to computing device 1302, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, a touchscreen, and so forth. Thus, computing device 1302 may be configured in a variety of ways as further described below to support user interaction.

Computing device 1302 also includes applications 1314. Applications 1314 are representative of any suitable applications capable of running on computing device 1302, and may include a web browser which is operable to access various kinds of web-based resources (e.g., assets, media clips, images, content, configuration files, services, user profiles, and the like). Applications 1314 include color picker application 126, as previously described. Furthermore, applications 1314 includes any applications supporting color picker system 116, system 900, and color picker support system 124.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1302. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1310, or combinations thereof. Computing device 1302 may be configured to implement particular instructions and functions corresponding to the software and hardware modules. Accordingly, implementation of a module that is executable by computing device 1302 as software may be achieved at least partially in hardware, e.g., through use of computer-readable storage media and hardware elements 1310 of processing system 1304. The instructions and functions may be executable/operable by one or more articles of manufacture (for example, one or more computing devices 1302 or processing systems 1304) to implement techniques, modules, and examples described herein.

The techniques described herein may be supported by various configurations of computing device 1302 and are not limited to the specific examples of the techniques described herein. This functionality may also be implemented all or in part through use of a distributed system, such as over a "cloud" 1316 via a platform 1318 as described below.

Cloud 1316 includes and is representative of a platform 1318 for resources 1320. Platform 1318 abstracts underlying functionality of hardware (e.g., servers) and software resources of cloud 1316. Resources 1320 may include applications, data, or applications and data that can be utilized while computer processing is executed on servers that are remote from computing device 1302. Resources 1320 can also include services provided over the Internet, through a subscriber network, such as a cellular or Wi-Fi network, or combinations thereof. Resources 1320 can include asset store 1322, which stores assets, such as digital images, photographs (e.g., user images in a gallery, a database of stock photographs, search results including photographs, and the like), color maps, document templates, user profile data, user image libraries, such as photographs posted in a shared photo service, and the like, and may be accessed by computing device 1302.

Platform 1318 may abstract resources and functions to connect computing device 1302 with other computing devices. Platform 1318 may also serve to abstract scaling of resources to provide a corresponding level of scale to encountered demand for resources 1320 that are implemented via platform 1318. Accordingly, in an interconnected device embodiment, implementation of functionality described herein may be distributed throughout system 1300. For example, the functionality may be implemented in part on computing device 1302 as well as via platform 1318 that abstracts the functionality of cloud 1316.

CONCLUSION

In one or more implementations, a digital medium environment includes at least one computing device. Systems, techniques, and devices are described herein for generating a color picker and exposing the color picker in the context of color adjustment, such as by displaying a color picker proximate a digital image for which a color is to be adjusted. Hence, at least part of the digital image is viewable while the color picker is exposed, making it easier for a user to select an appropriate color than with full-screen color pickers. Furthermore, a color picker acts as a window into a larger color map by exposing a portion of the color map. The portion of the color map that is exposed by the color picker is easily changed with user gestures, such as pan, scroll, and zoom gestures. Hence, a user is able to easily access any content of a color map having very large numbers of color, at any desired level of detail, to determine a current color of a color picker. Moreover, an indicator of current color is at a fixed position of a color picker and updated in real time as the content exposed by the color picker is changed (e.g., due to a user gesture), so that the current color of the color picker is determined without obstruction by a user, as opposed to a user touch directly on a color of a color picker to select a current color.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to select colors, a method implemented by a computing device, the method comprising:
    exposing, on a touchscreen of the computing device, a color picker depicting a portion of a color map, the color picker including:
        an indicator that displays a current color of the portion of the color map, the indicator enclosing a position on the color picker of the current color; and
        a designator of a previous color, the designator of the previous color touching the indicator that displays the current color, the designator of the previous color and the indicator that displays the current color being separated from other colors indicated by the color picker by a separator container;
    receiving a user gesture on the touchscreen for changing the portion of the color map depicted by the color picker;
    changing, responsive to the receiving the user gesture, the portion of the color map depicted by the color picker to a different portion of the color map depicted by the color picker; and
    updating, responsive to the changing the portion of the color map depicted by the color picker, the current color displayed by the indicator to an updated color displayed by the indicator based on a color of the different portion of the color map enclosed by the indicator at the position on the color picker.

2. The method as described in claim 1, further comprising:
    displaying, on the touchscreen, at least a portion of a digital image that is viewable while the color picker is exposed; and
    applying the updated color to at least part of the digital image.

3. The method as described in claim 1, wherein the indicator remains at a fixed position of the color picker while the indicator displays the current color and the updated color.

4. The method as described in claim 3, wherein the fixed position includes the center of the color picker.

5. The method as described in claim 1, wherein the portion of the color map and the different portion of the color map share a common portion of the color map, the common portion depicted by the color picker at different positions of the touchscreen for the portion of the color map and the different portion of the color map.

6. The method as described in claim 1, wherein the different portion of the color map depicted by the color picker depicts an area of the portion of the color map at a different level of detail than the portion of the color map depicted by the color picker.

7. The method as described in claim 1, wherein the color map is user selectable from a plurality of color maps, and at least one of the plurality of color maps includes a digital photograph.

8. The method as described in claim 1, further comprising setting the current color to the previous color, the portion of the color map determined from the previous color.

9. The method as described in claim 1, wherein the user gesture is received at a different position on the touchscreen than the position on the color picker of the current color.

10. The method as described in claim 1, further comprising:
    receiving a user input to disable a designator of a previous color of the color picker, the designator of the previous color surrounding the indicator that displays the current color; and
    expanding, responsive to the receiving the user input, a size of the indicator that displays the current color by populating the designator of the previous color with the current color.

11. In a digital medium environment to select colors, a system implemented by a computing device, the system including modules implemented at least partially in hardware of the computing device, the system comprising:
    a color picker module to determine content depicted on a touchscreen by a color picker including a portion of a color map, an indicator that displays a current color of the portion of the color map and that encloses a position on the color picker of the current color, and a designator of a previous color that surrounds the indicator that displays the current color;
    a user gesture module to receive a user input to disable the designator of the previous color and a user gesture indicative of a request for adjusting the current color; and
    the color picker module to:
        responsive to receiving the user input, expand a size of the indicator that displays the current color by populating the designator of the previous color with the current color; and
        responsive to receiving the user gesture:
            cause the color picker to depict a different portion of the color map; and
            update the indicator to display an updated color based on a color of the different portion of the color map enclosed by the indicator at the position on the color picker.

12. The system as described in claim 11, wherein the color map represents a three dimensional color space, and the color picker displays content of two dimensions of the color space, a third dimension of the color space accessible via a user control that adjusts the content of the two dimensions depicted by the color picker according to a value of the third dimension determined by the user control.

13. The system as described in claim 11, further comprising:
    a user interface module to cause display of a user interface on the touchscreen including a digital image and the color picker; and an image editing module to apply the updated color to at least part of the digital image.

14. The system as described in claim 13, wherein the image editing module applies the updated color to the at least part of the digital image responsive to the indicator being updated to display the updated color.

15. The system as described in claim 11, wherein the color picker module obtains the color map from a plurality of color maps based on a user selection.

16. The system as described in claim 11, wherein the color picker module is implemented to determine the current color of the portion of the color map as a color of the portion of the color map at a center location of the indicator.

17. The system as described in claim 11, wherein the color picker module is implemented to separate the designator of the previous color and the indicator that displays the current color from other colors indicated by the color picker with a separator container.

18. In a digital medium environment to select colors, a method implemented by a computing device, the method comprising:
 a step for simultaneously displaying, on a touchscreen of the computing device, a digital image and a color picker;
 extracting features of the digital image;
 a step for determining an additional digital image as a color map based on the features extracted from the digital image, the color picker depicting a portion of the color map and an indicator that displays a current color of the portion of the color map, the indicator enclosing a position on the color picker of the current color of the portion of the color map;
 a step for depicting, by the color picker, a different portion of the color map based on a user gesture;
 a step for updating the indicator to display an updated color based on a color of the different portion of the color map enclosed by the indicator at the position on the color picker; and
 applying the updated color to at least part of the digital image.

19. The method as described in claim 18, wherein user gesture indicates to adjust a location of the color picker within the color map by sliding the color picker through the color map by an amount based on a magnitude of the user gesture.

20. The method as described in claim 18, wherein the color picker includes a designator of a previous color, the designator of the previous color touching the indicator that displays the current color, the designator of the previous color and the indicator that displays the current color being separated from other colors indicated by the color picker by a separator container.

* * * * *